United States Patent
Takata et al.

[11] Patent Number: 5,915,099
[45] Date of Patent: Jun. 22, 1999

[54] BUS INTERFACE UNIT IN A MICROPROCESSOR FOR FACILITATING INTERNAL AND EXTERNAL MEMORY ACCESSES

[75] Inventors: Yukari Takata; Mitsugu Satou; Hiroyuki Kondo; Katsunori Sawai, all of Tokyo, Japan

[73] Assignee: Mitsubishi Denki Kabushiki Kaisha, Tokyo, Japan

[21] Appl. No.: 08/803,858

[22] Filed: Feb. 21, 1997

[30] Foreign Application Priority Data

Sep. 13, 1996 [JP] Japan .................................. 8-243374

[51] Int. Cl.⁶ ...................................................... G06F 13/00
[52] U.S. Cl. .......................... 395/280; 395/309; 395/872
[58] Field of Search ............................... 395/200.41, 280,
395/287, 290, 293, 306, 308, 309, 728,
842, 859, 872, 873, 876; 711/100, 106,
105, 154; 364/134

[56] References Cited

U.S. PATENT DOCUMENTS

| | | |
|---|---|---|
| Re. 34,850 | 2/1995 | Murakami et al. . |
| 4,912,636 | 3/1990 | Magar et al. . |
| 5,276,852 | 1/1994 | Callander et al. ....................... 395/425 |
| 5,317,709 | 5/1994 | Sugimoto . |
| 5,317,711 | 5/1994 | Bourekas et al. ................... 395/184.01 |
| 5,335,335 | 8/1994 | Jackson et al. ........................ 395/448 |
| 5,353,415 | 10/1994 | Wolford et al. ........................ 395/325 |
| 5,420,808 | 5/1995 | Alexander et al. ..................... 364/707 |
| 5,440,754 | 8/1995 | Goeppel et al. . |
| 5,463,753 | 10/1995 | Fry et al. ................................ 395/473 |
| 5,475,850 | 12/1995 | Kahn . |
| 5,488,729 | 1/1996 | Vegesna et al. ........................ 395/385 |
| 5,553,266 | 9/1996 | Metzger et al. ........................ 711/144 |
| 5,564,008 | 10/1996 | Foster et al. ........................... 395/309 |
| 5,598,362 | 1/1997 | Adelman et al. .................... 364/750.5 |
| 5,666,509 | 9/1997 | McCarthy et al. ..................... 711/206 |
| 5,687,350 | 11/1997 | Bucher et al. ......................... 711/140 |

FOREIGN PATENT DOCUMENTS

| | | |
|---|---|---|
| 60-29861 | 2/1985 | Japan . |
| 60-198667 | 10/1985 | Japan . |
| 62-224849 | 10/1987 | Japan . |
| 63-216170 | 9/1988 | Japan . |
| 5-324539 | 12/1993 | Japan . |

*Primary Examiner*—Ayaz R. Sheikh
*Assistant Examiner*—Xuan M. Thai
*Attorney, Agent, or Firm*—Burns, Doane, Swecker & Mathis, L.L.P.

[57] ABSTRACT

In a microprocesssor (101), a selector (7) is connected to a bus ID <0:127> through a write buffer (5) and a DRAM (27), a cache (28) and an IQ (8) are also connected to the bus ID <0:127>. The bus ID <0:127> and the microprocessor (101) are connected to the external memory (4) and the external bus master (41) with a data bus D <0:15> through a BIU (3). The microprocessor (101) is also connected to the external memory (4) and the external bus master (41) with an address bus (58) and control bus (57). The BIU (3) controls an access to a memory integrated in the microprocessor (101) and a memory externally connected thereto. With this configuration, the DRAM and the cache can be integrated together in the microprocessor which is externally connected to the bus master.

13 Claims, 21 Drawing Sheets

FIG. 6A CLOCK
FIG. 6B $\overline{BS}$
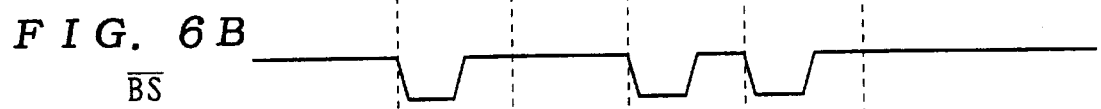
FIG. 6C DATA
FIG. 6D ADDRESS
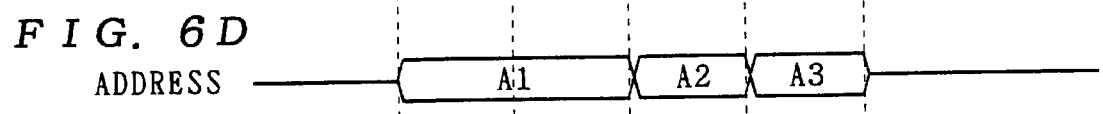
FIG. 6E R/$\overline{W}$
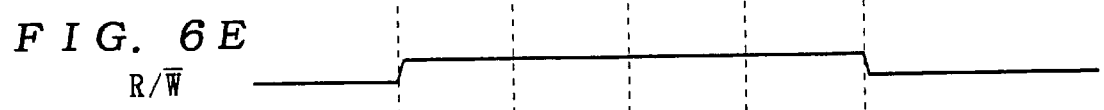
FIG. 6F BC
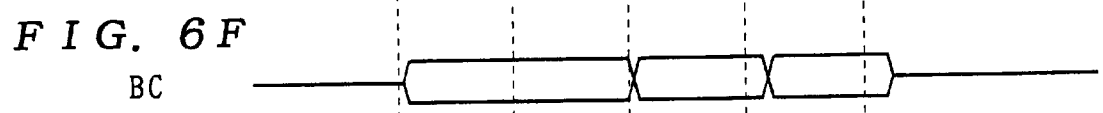
FIG. 6G $\overline{DC}$
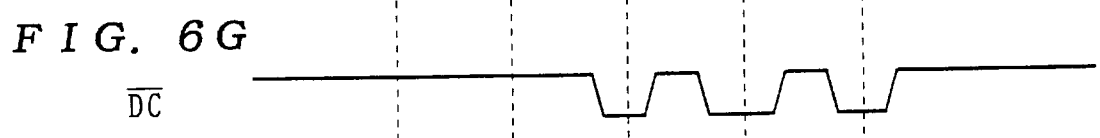

CLOCK $\overline{BS}$

DATA

ADDRESS

R/$\overline{W}$

BC $\overline{DC}$

CLOCK $\overline{HREQ}$ $\overline{HACK}$ $\overline{CS}$

DATA

ADDRESS

R/$\overline{W}$

BC $\overline{DC}$

CLOCK $\overline{HREQ}$ $\overline{HACK}$ $\overline{CS}$

FIG. 11A CLOCK
FIG. 11B $\overline{HREQ}$
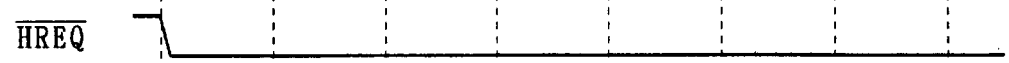
FIG. 11C $\overline{HACK}$
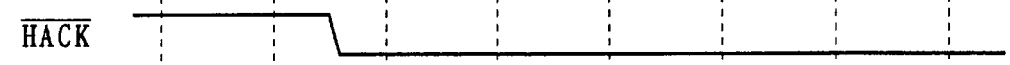
FIG. 11D $\overline{CS}$
FIG. 11E DATA
FIG. 11F ADDRESS
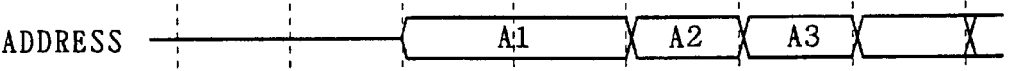
FIG. 11G R/$\overline{W}$
FIG. 11H BC
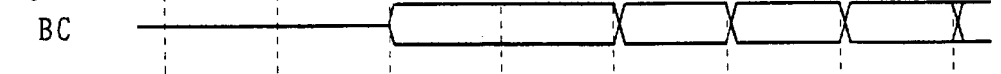
FIG. 11I $\overline{DC}$
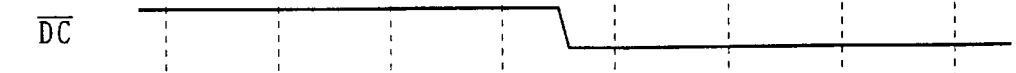

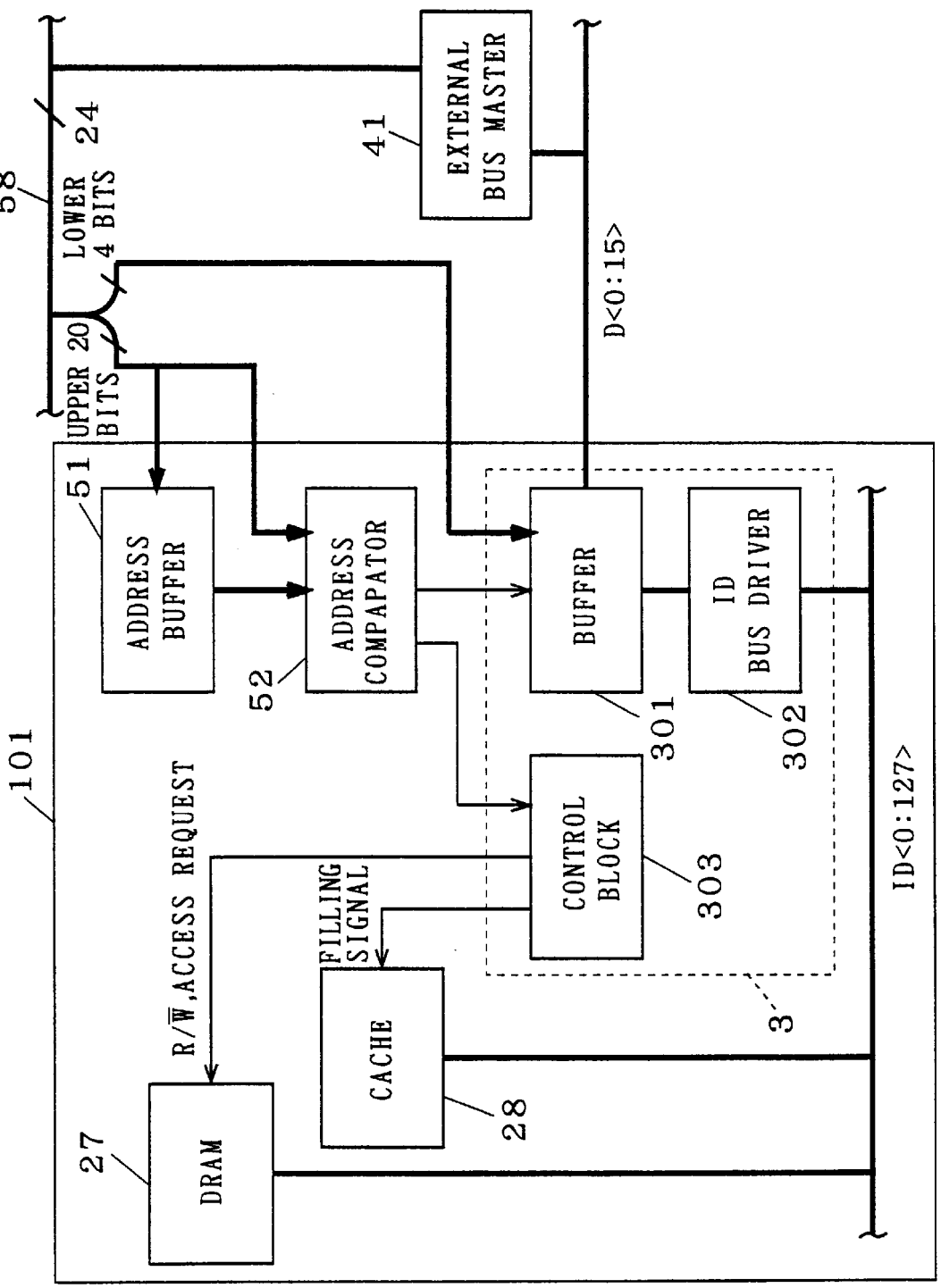
F I G. 1 2

CLOCK $\overline{CS}$

TERMINATION OF ACCESS REQUEST

DATA

ADDRESS

OVER ADDRESS LIMITS

R/$\overline{W}$

DATA STORED IN BUFFER 301

DATA TO BE PUT ON ID<0:127>

$\overline{DC}$

DRAM(OR CACHE) ACCESS REQUEST t4  t5  t6

CLOCK $\overline{CS}$

TERMINATION OF ACCESS REQUEST

DATA

ADDRESS

OVER ADDRESS LIMITS

R/$\overline{W}$

DATA STORED IN BUFFER 301

DATA TO BE PUT ON ID<0 : 127>

$\overline{DC}$

DRAM(OR CACHE) ACCESS REQUEST t0  t1           t2  t3

| | | | | | |
|---|---|---|---|---|---|
| h'FFFFFFF4 | | | | MSPR | CACHE PURGE CONTROL |
| h'FFFFFFF8 | | | | MDRR | DRAM REFRESH CONTROL |
| h'FFFFFFFc | | | | MCCR | MEMORY CONTROL |
| | | | | | |

MSPR  0 — — — — — — — 7 purge

MDRR  0 — — — — — — — 7 refresh

MCCR  0 — — — — — — 6 cache 7 mode

FIG. 23A CLOCK
FIG. 23B $\overline{CS}$
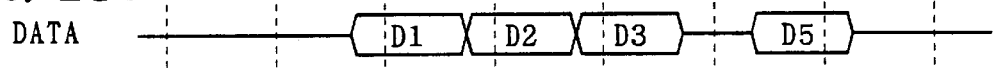
FIG. 23C DATA
FIG. 23D ADDRESS
FIG. 23E R/$\overline{W}$
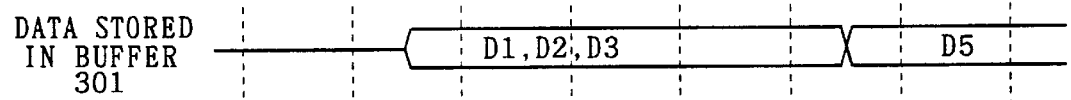
FIG. 23F DATA STORED IN BUFFER 301
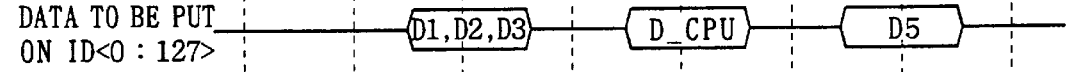
FIG. 23G DATA TO BE PUT ON ID<0 : 127>
FIG. 23H $\overline{DC}$
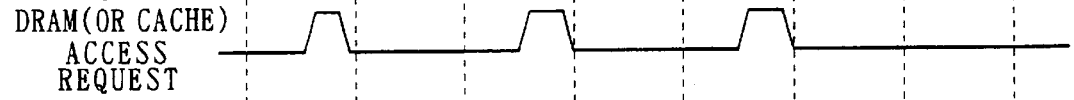
FIG. 23I DRAM(OR CACHE) ACCESS REQUEST
FIG. 23J ACCESS REQUEST BY CPU

BUS INTERFACE UNIT IN A MICROPROCESSOR FOR FACILITATING INTERNAL AND EXTERNAL MEMORY ACCESSES

BACKGROUND OF THE INVENTION

1. Field of the Invention

The present invention relates to a microprocessor, and more particularly to a bus interface used for making an external access to a memory integrated in the microprocessor and for filling a cache integrated in the microprocessor with instructions/data.

2. Description of the Background Art

A microprocessor with an integrated memory has been well known in the background art. FIG. 27 is a block diagram showing a configuration of the microprocessor with an integrated RAM, for example. A microprocessor 201 includes a CPU 1, an integrated RAM 29, a bus 59 and a bus interface unit (BIU) 39. The integrated RAM 29 may be a program RAM (including a ROM) or may be a data RAM (including a ROM). An SRAM has been used as the integrated RAM 29 to allow an access by one clock. A memory region of the integrated RAM 29 is specified by an address and accessed with an instruction.

In some cases, outside the microprocessor 201, an external memory 4 is provided and connected thereto through a bus 60. For example, a DRAM is used as the external memory 4. To control it, in some cases, the microprocessor 201 integrates a DRAM controller, a DMA controller (DMAC) and the like.

FIG. 28 is a block diagram showing a configuration of a microprocessor with an integrated cache memory (simply referred to as "cache" hereinafter). A microprocessor 202 includes the CPU 1, a cache 28, the bus 59 and BIU 39. Outside the microprocessor 202, the external memory 4 is provided and connected thereto through the bus 60. The cache 28 makes a caching of instructions and data stored in the external memory 4 and to be used in the microprocessor 202.

As a matter of course, both the RAM 29 and the cache 28 may be integrated in a microprocessor and the integrated cache 28 may make a caching of instructions and data stored in the integrated memory 29. However, the integrated memory 29 does not need a caching since it is a ROM or SRAM and can be accessed by about one clock.

The SRAM requires more area per cell than the DRAM, and accordingly it is impossible to achieve high-integration of SRAM. For this reason, a microprocessor is required to integrate a CPU core and the DRAM on one chip for high integration of memory. However, the DRAM has a disadvantage of slow access, and the time for memory access causes degradation in performance of a CPU.

If an external bus master (control means for accessing a memory through a bus) is provided besides the CPU integrated in the microprocessor, separate transfers of signals between the respective bus masters and the memory causes an increase in the required number of pins in the microprocessor.

SUMMARY OF THE INVENTION

The present invention is directed to a microprocessor. According to a first aspect of the present invention, the microprocessor comprises; an integrated memory; an internal bus connected to the integrated memory; an internal bus master for accessing the integrated memory through the internal bus; and a bus interface for controlling an operation of the internal bus. In the microprocessor of the first aspect, an external bus master and an external memory are externally connected to the microprocessor through an external bus. The microprocessor of the first aspect further comprises a cache memory to be filled with data stored in the integrated memory and the external memory. The bus interface (a) has a buffer having the same width as the internal bus, (b) arbitrates between a request for access to the integrated memory issued by the external bus master and that issued by the internal bus master, and (c) accepts a request for access to the integrated memory and the cache memory issued by the internal bus master while the buffer and the external bus master make accesses through the external bus.

According to a second aspect of the present invention, in the microprocessor of the first aspect, a control signal for controlling access is used commonly both in an access to the integrated memory by the external bus master and in an access to the external memory by the internal bus master.

According to a third aspect of the present invention, in the microprocessor of the first aspect, data stored in the buffer are once released when a plurality of addresses specified by the external bus master are located within and beyond predetermined address limits which are determined by a capacity of the buffer.

According to a fourth aspect of the present invention, the microprocessor comprises; an integrated memory; an internal bus connected to the integrated memory; first and second internal bus masters for accessing the integrated memory through the internal bus; and a bus interface for controlling an operation of the internal bus. In the microprocessor of the fourth aspect, the bus interface has memory access control means for ignoring an access request to the integrated memory issued by the second internal bus master when an access request to the integrated memory issued by the first internal bus master is valid.

According to a fifth aspect of the present invention, the microprocessor comprises; an integrated memory; an internal bus connected to the integrated memory; an internal bus master for accessing the integrated memory through the internal bus; and a bus interface for controlling an operation of the internal bus. In the microprocessor of the fifth aspect, an external bus master and an external memory are externally connected to the microprocessor through an external bus. The microprocessor further comprising a cache memory connected to the internal bus, to be filled with data stored in the integrated memory and the external memory. The bus interface generates an access request to the integrated memory issued by the internal bus master, an access request to the integrated memory issued by the external bus master and a filling signal for indicating a cache object of the cache memory on the basis of information specifying a cache mode.

Thus, in the microprocessor of the present invention, with a plurality of cache modes, various purposes can be attained by only one chip. That allows cost cutting. Moreover, cost cutting is also achieved by reduction in the number of pins. Controlling the transfer of instructions/data to the CPU through the external data bus narrower in bit width than the internal data bus in a burst operation achieves higher performance.

In the microprocessor of the first aspect of the present invention, the external bus master as well as the internal bus master can access the integrated memory to perform a read/write operation.

In the microprocessor of the second aspect of the present invention, the external bus master as well as the internal bus master can access the integrated memory without increasing the required number of pins in the microprocessor, and the internal bus master can access the external memory.

In the microprocessor of the third aspect of the present invention, even if the address is located beyond the predetermined address limits, it is possible to avoid the transfer of wrong data.

In the microprocessor of the fourth aspect of the present invention, an operation of the microprocessor can be controlled even if the microprocessor integrates a plurality of internal bus masters.

In the microprocessor of the fifth aspect of the present invention, caching can be made in a plurality of cache modes, such as an instruction cache mode and an internally-shared cache mode, which are selectively established, or may not be made.

An object of the present invention is to enhance the performance of the CPU with a DRAM of high capacity and low speed and a cache of low capacity and high speed integrated together on one chip. Another object of the present invention is to provide a microprocessor which selects type of data to be cached by selecting a cache mode. A further object of the present invention is to provide a microprocessor which changes how to use the integrated memory and the external memory (how to store a main program, data and the like) without increasing the number of pins even if the bus master accessing the integrated memory is externally provided or the external memory is connected to the microprocessor. An yet object of the present invention is to provide a microprocessor which integrates a plurality of bus masters therein.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6G are timing charts showing a protocol in reading data from an external memory 4 by a CPU 1;

FIGS. 11A to 11I are timing charts showing a protocol in reading data from the DRAM 27 by the external bus master 41;

FIG. 12 is a block diagram showing means for performing an operation in handling an address located beyond the address limits;

FIGS. 23A to 23J are timing charts showing a read operation by the external master 41 and the CPU 1;

DESCRIPTION OF THE PREFERRED EMBODIMENTS

The First Preferred Embodiment.

Figure 1:
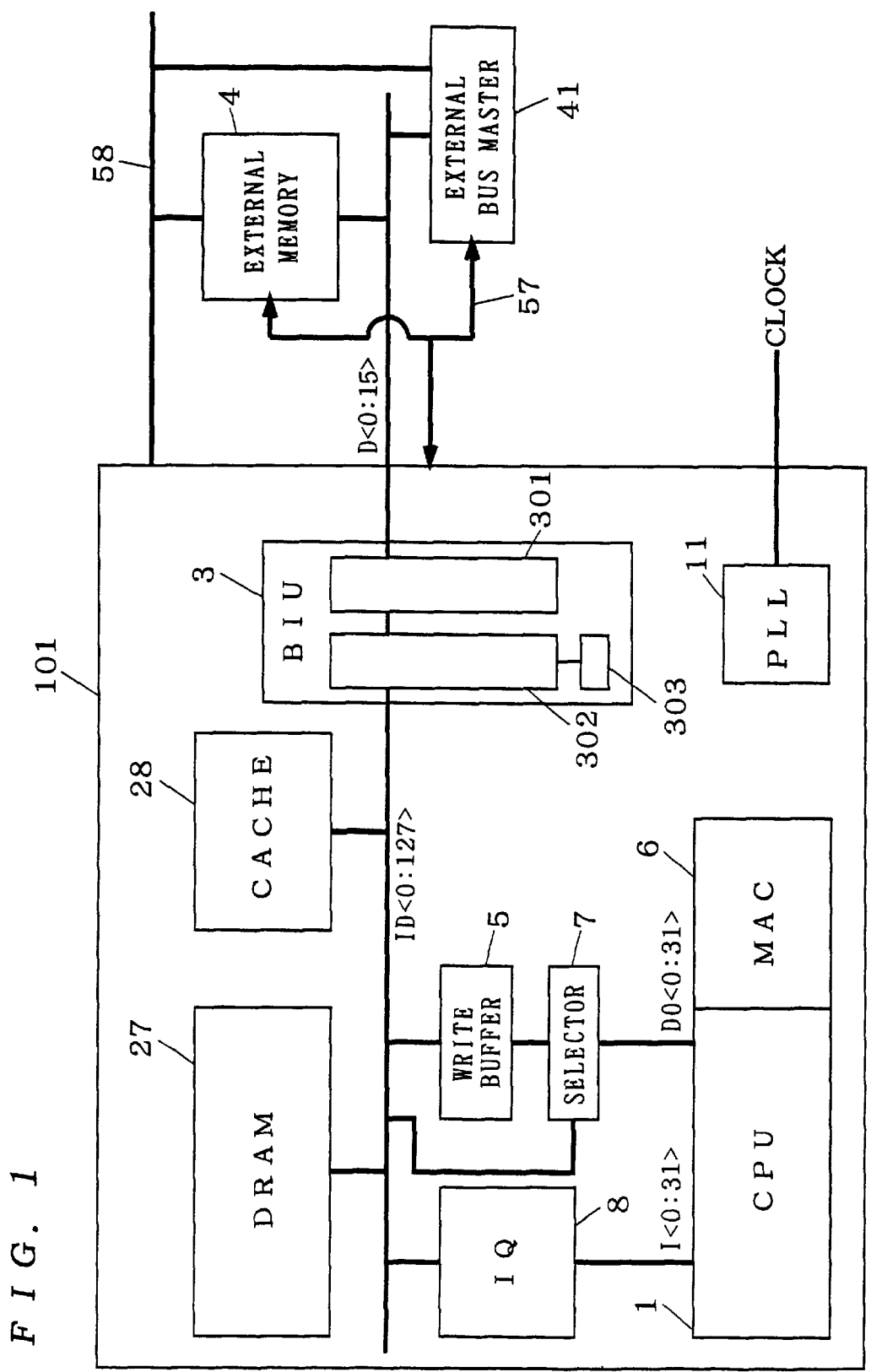
FIG. 1 is a block diagram showing a first preferred embodiment of the present invention.

FIG. 1 is a block diagram showing of a configuration of a microprocessor 101 in accordance with the first preferred embodiment of the present invention in outline. The microprocessor 101 includes a DRAM 27, a cache 28, a CPU 1, an instruction queue (IQ) 8, a selector 7, a multiply and accumulator (MAC) 6, a BIU 3 and a PLL 11.

The CPU 1 is, for example, a RISC-type microprocessor core for processing 32-bit data, and an instruction has a length of 16 bit or 32 bit. The IQ 8 having, e.g., 128-bit×2 entries receives instruction from a bus ID <0:127> and performs transfer of data in a 16-bit or 32-bit form to the CPU 1 through a bus I <0:31>.

Figure 2:
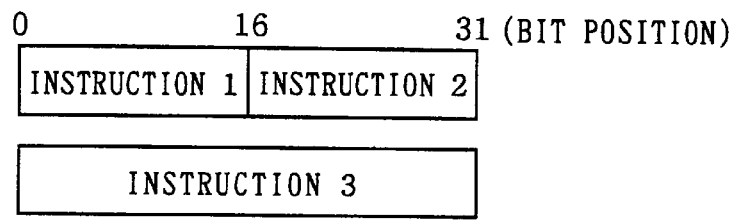
FIG. 2 is a schematic view illustrating instruction formats.

FIG. 2 is a schematic view illustrating instruction formats. Since no instruction across the address limits is permitted, only two types as shown in FIG. 2 are allowed as instruction format.

The selector 7 selects the needed 32 bits out of 128-bit data on the bus ID <0:127> to be transferred to the CPU 1, and delivers the 32-bit data outputted from the CPU 1 to an appropriate position on the bus ID <0:127>. The transfer of the 32-bit data is performed through a bus DO <0:31>. The MAC 6, accompanying the CPU 1, performs multiplication and accumulation of e.g., 32-bit×16-bit+56-bit data by one clock.

The cache 28 is e.g., an SRAM and is e.g. 4 KBytes write-back cache. In the write back system, write operation is made only in the cache and a block of the cache in which data are changed is written into a main memory when it is to be replaced. The cache 28 has a TAG portion where part of address (tag) for data to be cached, a valid bit and a dirty bit are stored. When the data fill the cache 28, the valid bit is set, and when new data are stored in a region filled with data, the dirty bit is set. When a cache hit is found, data are fetched by one clock. The DRAM 27 has a capacity of e.g., 2 MB.

The selector 7 is connected to the bus ID <0:127> through a write buffer 5 having a capacity of 128 bits, and the DRAM 27, the cache 28 and the IQ 8 are also connected to the bus ID <0:127>. The BIU 3 is provided between the bus ID <0:127> and a data bus D <0:15> connecting the microprocessor 101 to the outside (for example, the external memory 4 and an external bus master 41). The microprocessor 101 and the external memory 4 are coupled with the control bus 57 and the address bus 58. The microprocessor 101 and the external bus master 41 are coupled with the control bus 57 and the address bus 58.

The BIU 3 controls accesses to the integrated memory of the microprocessor and the external memory connected to the microprocessor. For the match between the 16-bit bus D <0:15> and the 128-bit bus ID <0:127>, the BIU 3 has a buffer 301 of 128 bits. The BIU 3 also has a bus driver 302 interposed between the buffer 301 and the bus ID <0:127>. A control block 303 controls an operation of the bus driver 302, and also has a function of issuing a read/write command (signal R/$\overline{\text{W}}$) and a filling command to the cache 28.

The PLL 11 generates an operating clock of the microprocessor. For example, the PLL 11 generates a quadruple-frequency clock of an input clock for the operation of the internal CPU and the like and generates a clock having the same frequency as an input clock for external access.

FIGS. 3A to 3D are schematic views each showing an execution of instruction. The instructions are executed under a pipeline control. For example, the pipeline control consists of five stages: instruction fetch (IF), instruction decode (ID), execution (E), memory access (MEM) and write back (WB) into a general-purpose register.

Figure 3A:
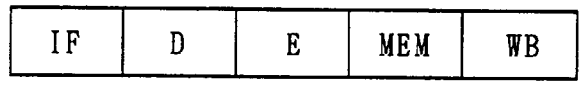
FIGS. 3A to 3D are schematic views each illustrating an execution of instruction.
Figure 3B:
Figure 3C:
Figure 3D:
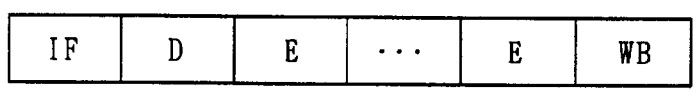

The CPU 1 has a RISC-type architecture and makes an operand access to memory only in load and store instructions. In FIG. 3A, the instruction is a load instruction of which operand is hit in the cache and data stored in the memory can be transferred in one cycle. In FIG. 3B, the execution of instruction takes a plurality of clocks to make an access to data in the memory. In FIG. 3C, the execution of instruction includes no access to the memory. In FIG. 3D, the execution of instruction, such as multiplication and division, needs a plurality of clocks.

(1) Transfer of Instruction/Data

When the instruction to be fetched by the CPU 1 is hit in the cache 28, data are transferred from the cache 28 to the IQ 8 through the bus ID <0:127> in one-clock cycle.

When the instruction to be fetched by the CPU 1 is found in the DRAM 27, data are transferred from the DRAM 27 to the IQ 8 through the bus ID <0:127> by one access (e.g., in five-clock cycle).

When the instruction to be fetched by the CPU 1 is found in the external memory 4, data are fetched from the external memory 4 in a burst transmission mode and stored in sequence into the buffer 301 of the BIU 3. When the buffer 301 is full (when instructions of 128 bits are stored therein), the instructions of 128 bits are transferred to the IQ 8. When the instructions are to be cached, the instructions are concurrently transferred to the cache 28.

Figure 4:
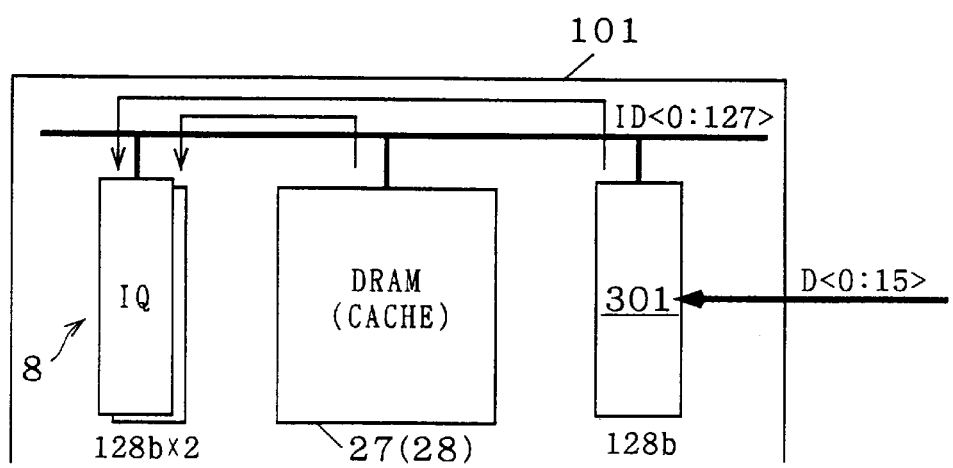
FIGS. 4 and 5 are block diagrams showing a transfer of instructions.

FIG. 4 is a block diagram showing the transfer of instruction to the IQ 8 having a capacity of 2-entry×128 bits. As shown in FIG. 4, the instructions are transferred from the DRAM 27 (or cache 28) and the buffer 301 having a capacity of 128 bits.

Figure 5:
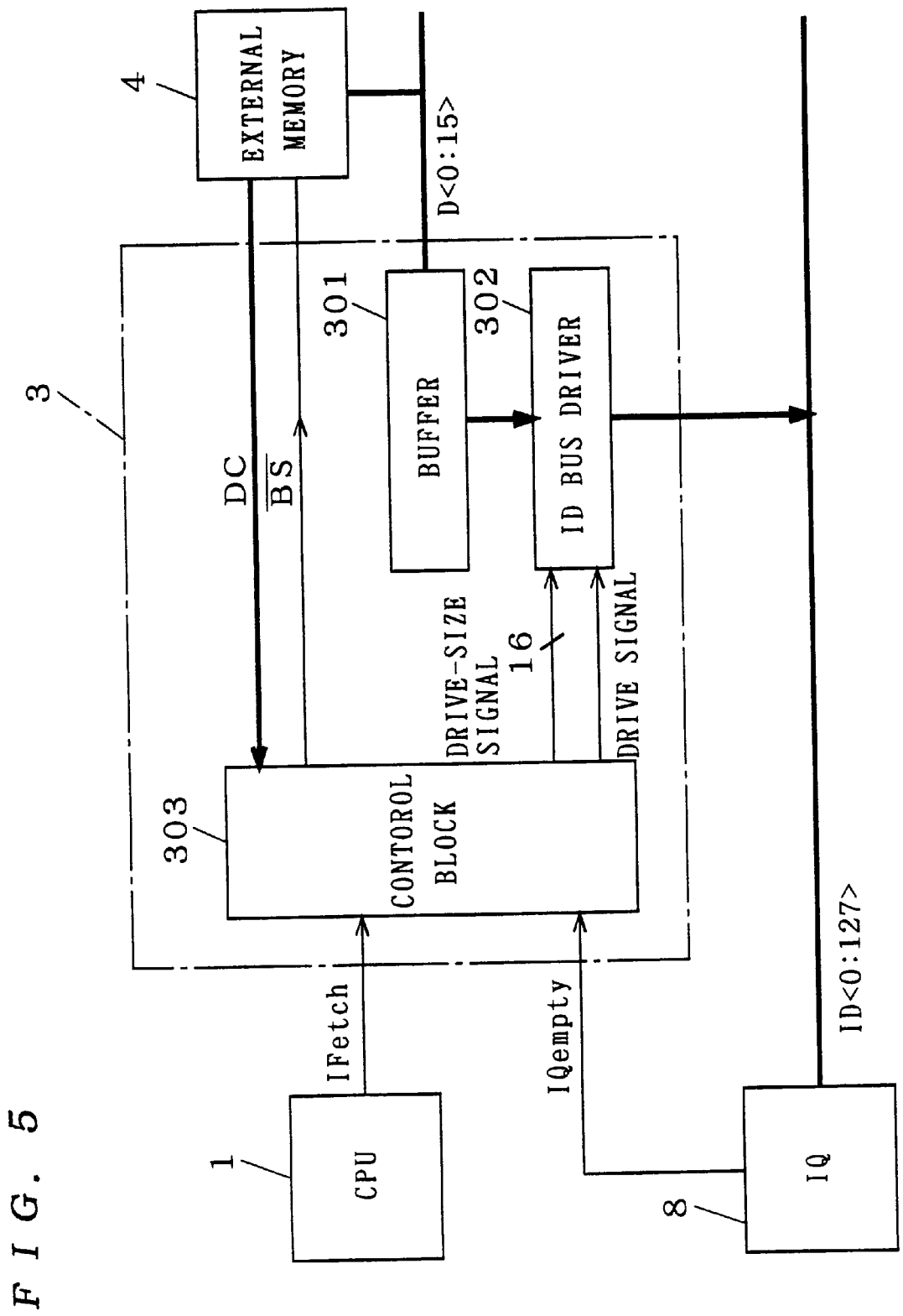
Figure 7A:
FIGS. 7A to 7G are timing charts showing a protocol in writing data into the external memory 4 by the CPU 1.
Figure 7B:
Figure 7C:
Figure 7D:
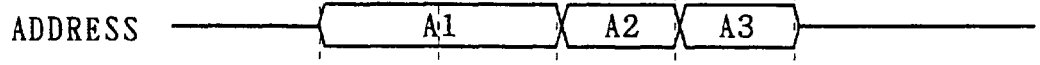
Figure 7E:
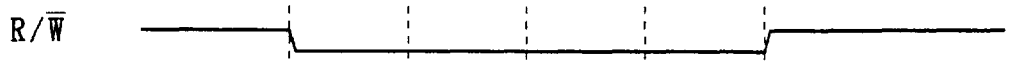
Figure 7F:
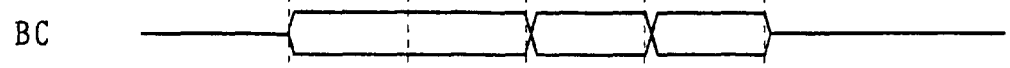
Figure 7G:
Figure 8A:
FIGS. 8A to 8I are timing charts showing a protocol in writing data into a DRAM 27 by an external bus master 41.
Figure 8B:
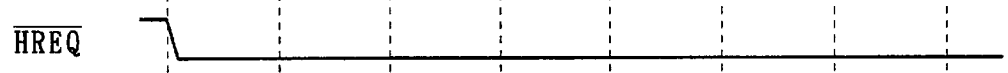
Figure 8C:
Figure 8D:
Figure 8E:
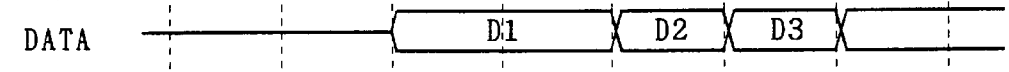
Figure 8F:
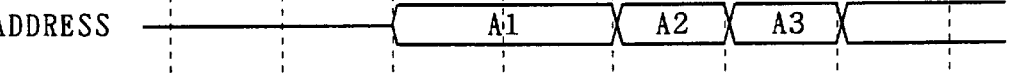
Figure 8G:
Figure 8H:
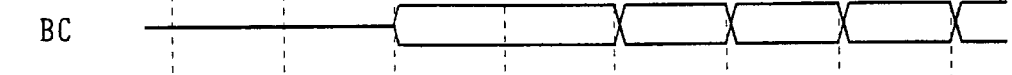
Figure 8I:
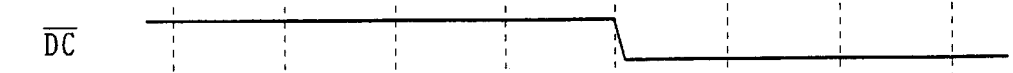
Figure 9A:
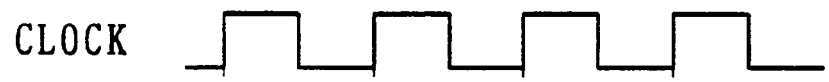
FIGS. 9A to 9D are timing charts showing a termination of access made by the external bus master 41.
Figure 9B:
Figure 9C:
Figure 9D:

FIG. 5 is a block diagram illustrating the transfer of instruction from the external memory 4 by a request of the CPU 1 that needs an instruction immediately (when the IQ 8 is empty). The control block 303 included in the BIU 3 receives a signal IFetch from the CPU 1, indicating a request to fetch an instruction, and when the signal is asserted, asserts a bus start signal $\overline{\text{BS}}$ for the external memory 4 (the bus start signal $\overline{\text{BS}}$ is transferred through the control bus 57 of FIG. 1, for example). After that, the instruction is transferred to the buffer 301 of the BIU 3 through the bus D <0:15>. If a signal IQ empty transferred from the IQ 8 to the control block 303 and indicating that the IQ 8 is empty is asserted, the control block 303 gives a drive signal and a drive-size signal to the ID bus driver 302.

The drive-size signal is a signal of 16 bits. The 128-bit data stored in the buffer 301 are recognized sixteen 8-bit data and the needed information is designated in units of 8bits. The designated information is transferred to the bus ID <0:127> according to the drive signal. For example, two bits of the drive-size signal are activated and 8×2=16 bits of the information data are transferred to the IQ 8 through the bus ID <0:127>. When the CPU 1 issues a further request to fetch an instruction, 16 bits of data are further transferred to the IQ 8. After that, if the CPU 1 needs no more instruction immediately (the signal IQ empty is negated), the data given from the external memory 4 in the burst transmission mode fill the buffer 301 and are thereafter transferred to the IQ 8. The control block 303 receives a data transfer completion signal $\overline{\text{DC}}$ transferred from the external memory 4 through the control bus 57.

It is naturally possible that the first instruction may be always transferred without checking whether the IQ 8 is full or empty and then the 128-bit data may be transferred to and written into the cache 28 if the buffer 301 becomes full.

Referring back to FIG. 1, in reading data by a request of the CPU 1, if the data are found in the DRAM 27 or the cache 28, 128-bit data including the requested data are transferred to the selector 7 through the bus ID <0:127>. The selector 7 transfers the needed 32-bit data to the CPU 1. If the requested data are found in the external memory 4, the 32-bit data are stored in the buffer 301 and transferred to the CPU 1 through the bus ID <0:127>.

There are three sorts of data size, 8bits, 16 bits and 32 bits. When 32-bit data are read out from the external memory 4, two external accesses are required and when 8-bit or 16-bit data are read, only one external access is required to transfer the data from the buffer 301 to the CPU 1 through the bus ID <0:127>.

When the CPU 1 requests to write 32-bit data into the memory (DRAM 27 or cache 28), the selector 7 outputs the data to the corresponding position of the bus ID <0:127>. At this time, the data to be written may be once stored in the write buffer 5 and then transferred. In other words, the data are transferred from the write buffer 5 to the bus ID <0:127> when the bus ID <0:127> is not full. When the data are to be outputted to the external memory 4, the data are once latched in the buffer 301, and outputted to the bus D <0:15> by 16 bits.

(2) Access to Integrated Memory of Microprocessor by External Bus Master

The DRAM 27 integrated in the microprocessor 101 can be directly accessed by the external bus master as well as the CPU 1, regardless of instructions of the microprocessor 101. A bus master means a thing that can access the memory through the bus, and is a DMAC (Direct Memory Access Controller), a processor, a memory controller or the like, for example.

The external bus master 41 of FIG. 1 is connected to the microprocessor 101 through the data bus D <0:15>, the address bus 58 and the control bus 57. The external bus master 41 issues an access request to the microprocessor 101 and when the request is accepted, the external bus master 41 can make a direct access to the DRAM 27. Protocols on accesses to the DRAM 27 and the external memory 4 by the CPU 1 and the external bus master 41 will be discussed below.

(2-a) Access to DRAM 27 by CPU 1

A protocol on access to the DRAM 27 by the CPU 1, which has been conventionally used, is that: ① the CPU 1 issues an access request, ② the BIU 3 accepts the request and ③ the data stored in the DRAM 27 are transmitted to the CPU 1 through the ID bus <0:127> under the control by the BIU 3.

(2-b) Read of Data from External Memory 4 by CPU 1

FIGS. 6A to 6G are timing charts showing a protocol on a read operation of data from the external memory 4 by the CPU 1. The clock of FIG. 6A is an input clock. The protocol is as follows. ① The CPU 1 issues an access request to the BIU 3. ② The BIU 3 gives an access permit to the CPU 1. ③ The bus start signal $\overline{BS}$ which is transferred from the BIU 3 to the external memory 4 through the control bus 57 is asserted, the read/write signal R/$\overline{W}$ gives a request for read operation to the external memory 4, and the value of a byte control signal BC (by which either or both of two 8-bit of the bus D<0:15> are designated) is determined. Addresses A1, A2 and A3 are outputted from the microprocessor 101 through the address bus 58. The byte control signal BC may vary according to the addresses A1, A2 and A3.

④ Receiving the access request from the microprocessor 101, the external memory 4 transfers read data D1, D2 and D3 corresponding to the addresses A1, A2 and A3 to the bus D <0:15>, and the data transfer completion signal DC is asserted on every transfer of the read data. Finally, ⑤ The data D1, D2 and D3 are transferred to the CPU 1 through the bus ID <0:127>.

(2-c) Write of Data into External Memory 4 by CPU 1

FIGS. 7A to 7G are timing charts showing a protocol on a write operation of data into the external memory 4 by the CPU 1. The processes ① and ② are the same as those of (2-b). ③ The write data (data to be written by the CPU 1 through the bus ID <0:127>) are transferred to the BIU 3. ④ The bus start signal $\overline{BS}$ is asserted, the read/write signal R/$\overline{W}$ gives a request for write operation to the external memory 4 and the value of the byte control signal BC is determined. The addresses A1, A2 and A3 are outputted from the microprocessor 101 through the address bus 58, and the corresponding write data D1, D2 and D3 are outputted from the microprocessor 101 through the bus D <0:15>. ⑤ Receiving the access request from the microprocessor 101, the data D1, D2 and D3 are written into the external memory 4, and the data transfer completion signal $\overline{DC}$ is asserted on every write of the data.

(2-d) Write of Data into DRAM 27 by External Bus Master 41

FIGS. 8A to 8I are timing charts showing a protocol on a write operation of data into the DRAM 27 by the external bus master 41. The protocol is as follows. ① A halt request signal $\overline{HREQ}$ indicating a request for acceptance issued by the external bus master 41 is asserted. In response thereto, an HREQ acknowledge signal $\overline{HACK}$ for acknowledgment of the signal $\overline{HREQ}$ outputted from the microprocessor 101 is asserted. Subsequently, a chip selection signal $\overline{CS}$ outputted from the external bus master 41 is asserted. These signals are transferred between the microprocessor 101 and the external bus master 41 through the control bus 57. ② The read/write signal R/$\overline{W}$ which is transferred from the external bus master 41 to the microprocessor 101 gives a request for write operation to the DRAM 27, and the addresses A1, A2 and A3 and the corresponding write data D1, D2 and D3 are transferred to the microprocessor 101. ③ The data transfer completion signal $\overline{DC}$ outputted from the microprocessor 101 is asserted.

FIGS. 9A to 9D are timing charts showing a termination of access made by the external bus master 41. ④ The chip selection signal $\overline{CS}$ and the halt request signal $\overline{HREQ}$ are negated. ⑤ The microprocessor 101 terminates acceptance (the HREQ acknowledge signal $\overline{HACK}$ is negated).

Figure 10:
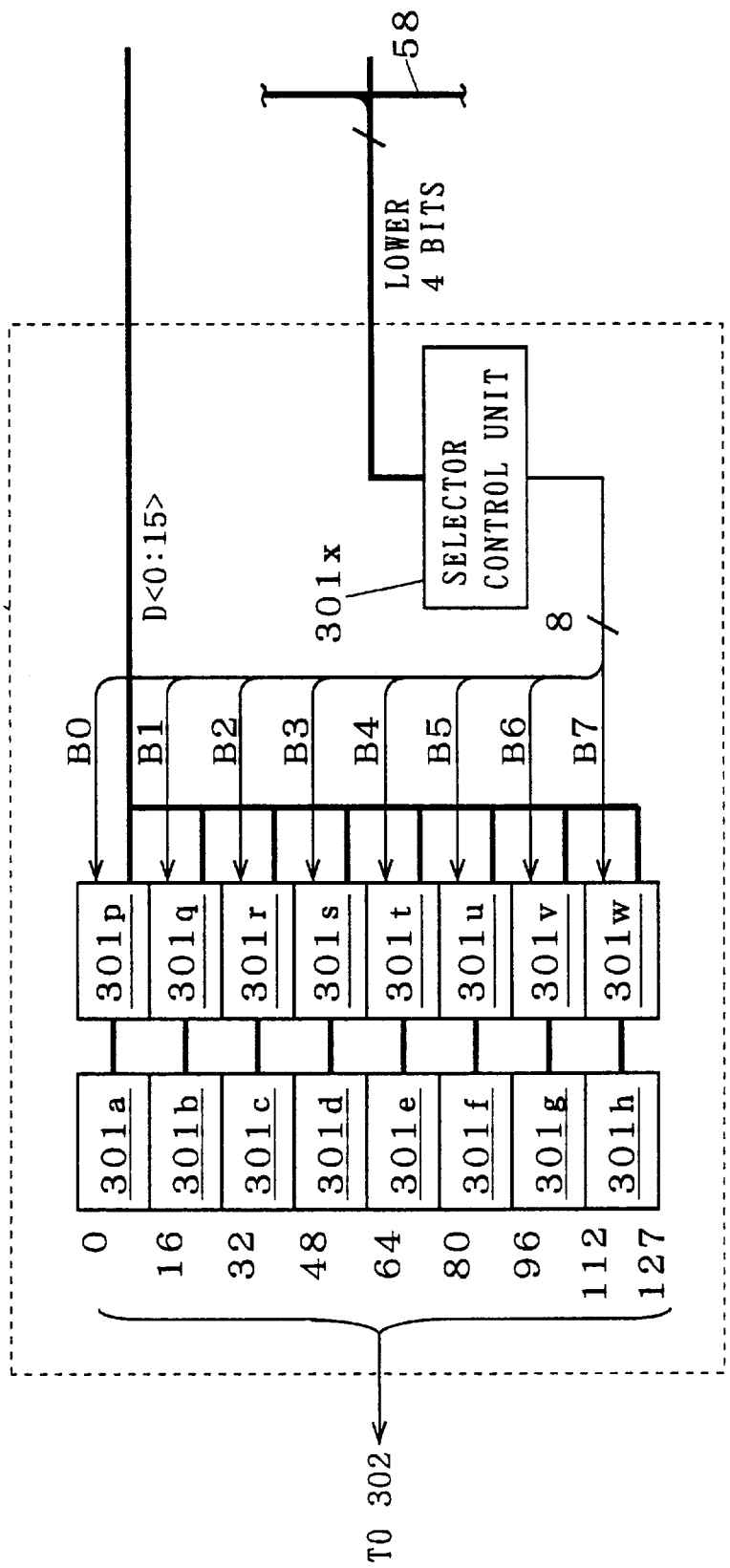
FIG. 10 is a block diagram showing a configuration of a buffer 301.
Figure 13A:
FIGS. 13A to 13I are timing charts showing the operation in handling the address located beyond the address limits.
Figure 13B:
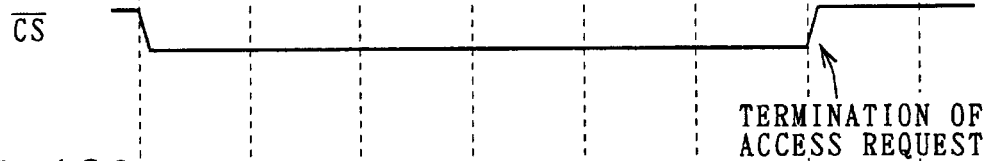
Figure 13C:
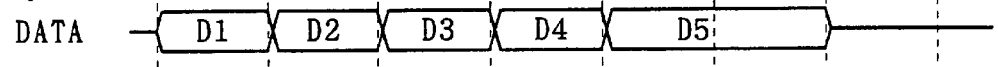
Figure 13D:
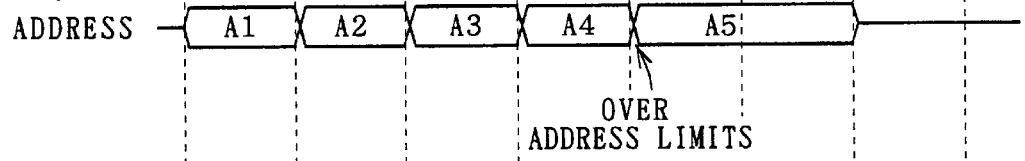
Figure 13E:
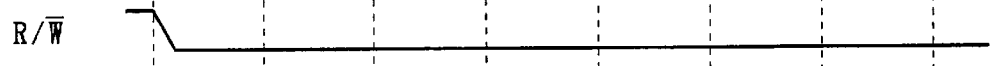
Figure 13F:
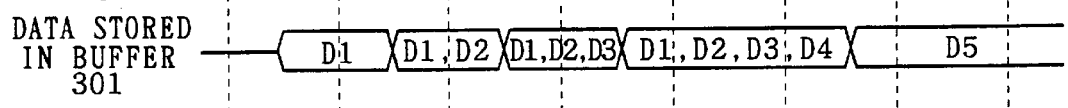
Figure 13G:
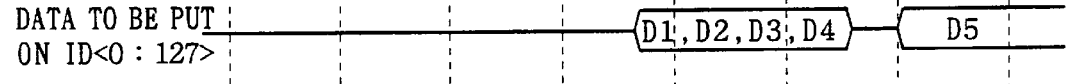
Figure 13H:
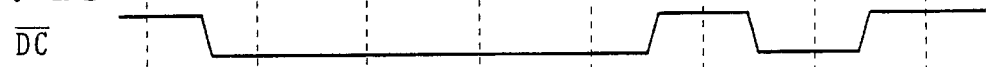
Figure 13I:
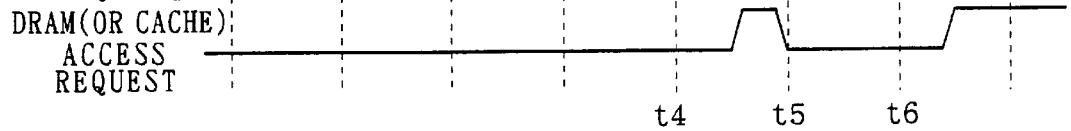
Figure 14A:
FIGS. 14A to 14I are timing charts showing the operation in handling the address located beyond the address limits.
Figure 14B:
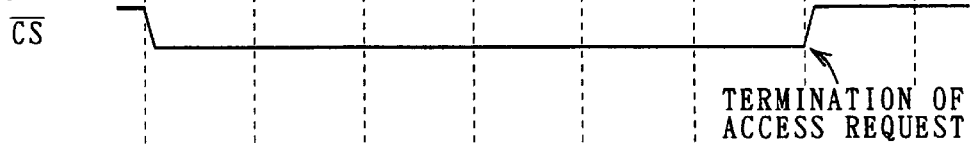
Figure 14C:
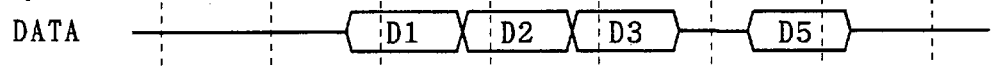
Figure 14D:
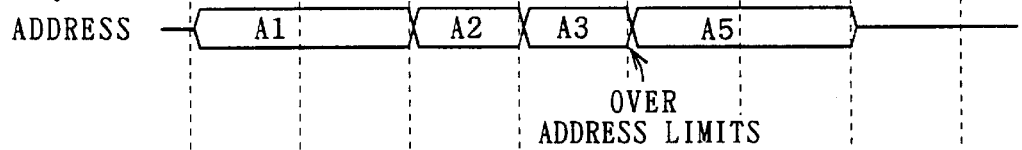
Figure 14E:
Figure 14F:
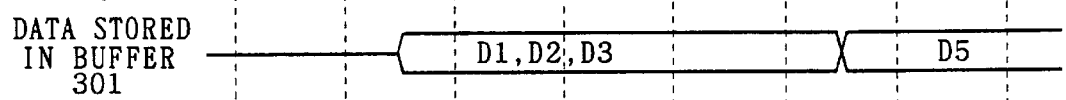
Figure 14G:
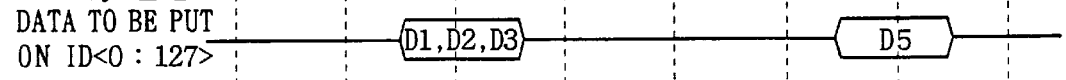
Figure 14H:
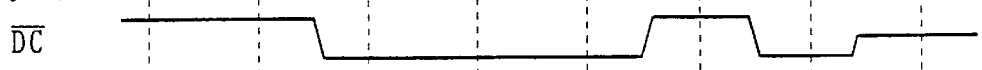
Figure 14I:

FIG. 10 is a block diagram showing a configuration of the buffer 301. The buffer 301 has a capacity of 128 bits, and on the other hand the data bus D <0:15> has a bit width of 16 bits. Accordingly, the buffer 301 has eight latches 301a to 301h each having a capacity of 16 bits and the corresponding selectors 301p to 301w, and stores data to be put on the bus D <0:15> according to the address value given by the external bus master 41 into the latches 301a to 301h.

For example, the data specified by an address has a width of 8bits, and a latch can store data blocks corresponding to two addresses. Specifically, the data blocks corresponding to a pair of adjacent addresses are stored in the same latch. To implement this operation, the buffer 301 further has a selector control unit 301x, and the selector control until 301x gives selector control signals B0 to B7 to the selectors 301p to 301w, respectively, according to the 3 bits except the least significant bit of the lower 4 bits of the address. The selector control signals B0 to B7 are activated in an alternative manner and store the 8-bit data on the bus D <0:15> into one of the latches 301a to 301h.

(2-e) Read of Data from DRAM 27 by External Bus Master 41 FIGS. 11A to 11I are timing charts showing a protocol on a read operation of data from the DRAM 27 by the external bus master 41. The process ① is the same as that of (2-d). ② The read/write signal R/$\overline{W}$ which is transferred from the external bus master 41 to the microprocessor 101 gives a request for read operation to the DRAM 27, and the addresses A1, A2 and A3 are transferred to the microprocessor 101. ③ The data D1, D2 and D3 corresponding to the addresses A1, A2 and A3 are read out to be outputted from the microprocessor 101, and then the data transfer completion signal $\overline{DC}$ is asserted. The processes ④ and ⑤ are the same as those of (2-d).

When the external bus master 41 and the buffer 301 perform read/write operations through the bus D <0:15>, the BIU 3 accepts the accesses to the cache 28 and the DRAM 27 made by the CPU 1. When the external bus master 41 reads data out from the DRAM 27, the data stored in the DRAM 27 or the data stored in the cache 28 if a cache hit is found are transferred to the buffer 301. The buffer 301 has a capacity of 128 bits and the bus D <0:15> has a bit width of 16 bits. The bus ID <0:127> is not used when the external bus master 41 requests to read some data out from the buffer 301. Therefore, when the CPU 1 requests to fetch an instruction from the DRAM 27, for example, the BIU 3 accepts the request and transfers the instruction fetched from the DRAM 27 (or from the cache 28 if a cache hit is found) through the bus ID <0:127>.

When the external bus master 41 requests to write data into the DRAM 27, similarly, the data can be transferred between the CPU 1, the DRAM 27 and the cache 28 through the bus ID <0:127> while the data are stored in the buffer 301. FIGS. 23A to 23J are timing charts showing a read request issued by the external master 41 and a read-access request issued by the CPU 1. The addresses A1, A2 and A3 designated by the external bus master 41 are located not beyond the address limits (these addresses are located within predetermined limits, and details will be discussed in (2-f), the data D1, D2 and D3 corresponding to the addresses A1, A2 and A3 are read out at a time (the leftmost assertion of FIG. 23I of the access request to the DRAM (the cache)), and the data are put on the bus ID <0:127> and then stored in the buffer 301.

Since the bus ID <0:127> is not used after that, the request for access to the DRAM is asserted (the center assertion of FIG. 23I) in response to the access request issued by the CPU 1, and data D_CPU according to that request are read out and put on the bus ID <0:127>. On the other hand, the data D1, D2 and D3 are transferred from the buffer 301 to the external bus master 41.

A request for access to the DRAM (or cache) at an address A5 located beyond the address limits within which the addresses A1, A2 and A3 are located is asserted (the rightmost assertion of FIG. 23I). Then, data D5 corresponding to the address A5 are read out, being transferred through the bus ID <0:127>, and stored into the buffer 301.

Figure 22:
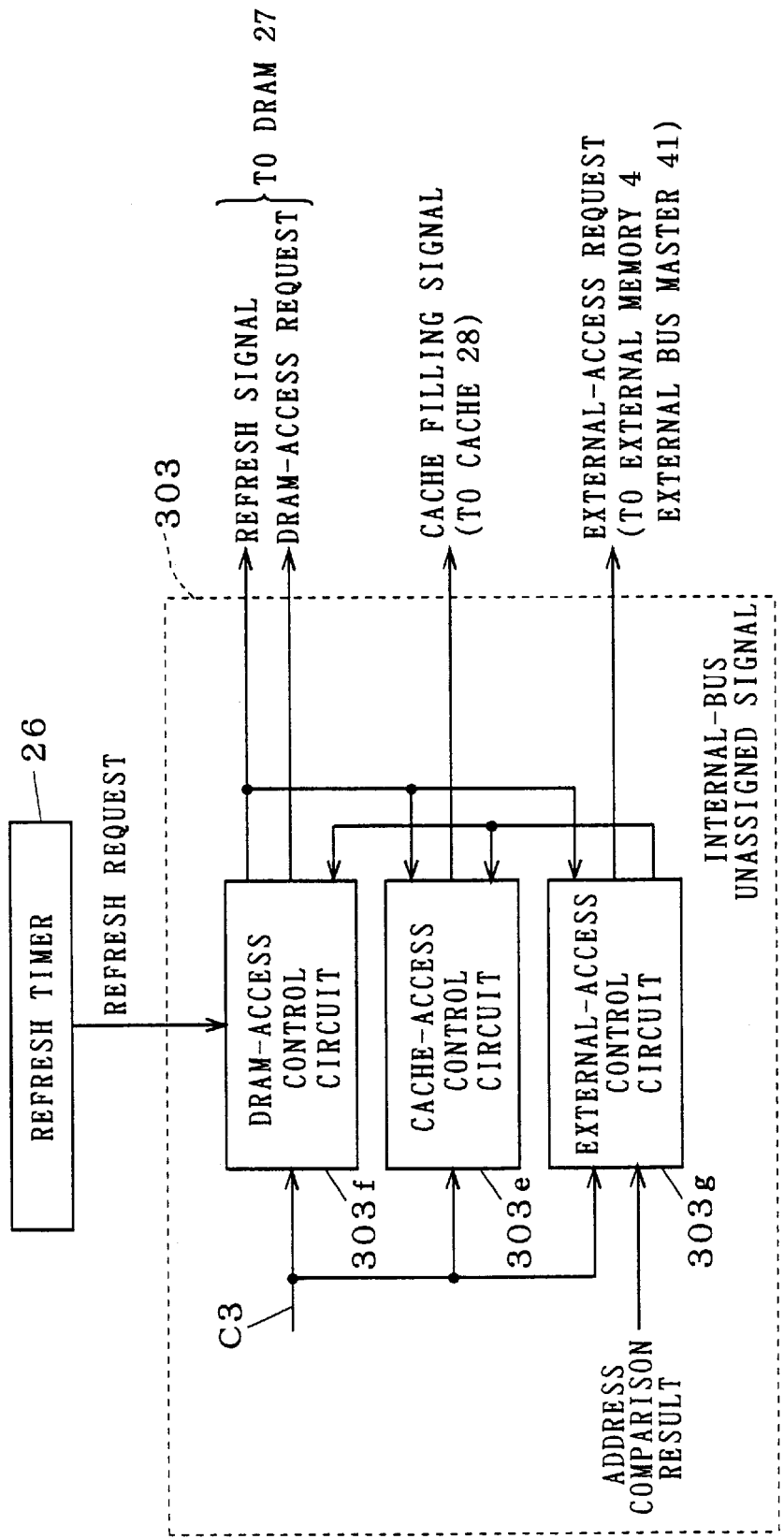
FIG. 22 is a block diagram showing a connection of a refresh timer 26.

An external-access control circuit 303g shown in FIG. 22, as discussed later, receives an address comparison result, an access-type detection result and a refresh request and generates an external-access request and an internal-bus unassigned signal. The internal-bus unassigned signal indicates that the internal bus is unassigned when the external bus access needs no internal bus or during an access made at an access address specified by the external bus master 41 which is located not beyond the address limits. While the signal is asserted, an access is made to the DRAM 27 or the cache 28 in response to the access request issued by the CPU 1.

(2-f) Write of Data into DRAM 27 by External Bus Master 41 at Address beyond Address Limits As discussed with reference to FIG. 10, sixteen 8-bit data corresponding to contiguous addresses in lower 4 bits are stored in the buffer 301. For example, if addresses of 24-bit width have the same upper 20 bits, 16×8-bit data=128-bit data are transferred to the DRAM 27 as a unit. However, if the addresses of 24-bit width have different upper 20 bits, the transfer of the data as a unit must be avoided since it would result in write of the data at wrong addresses. In other words, if the address value specified by the external bus master 41 falls over the limits of 16 bits (in terms of data, the limits of 16×8=128 bits: simply referred to as "address limits" in this specification), it is necessary to once release the data stored in the buffer 301.

FIG. 12 is a block diagram showing means for performing such an operation as above. The microprocessor 101 includes an address buffer 51 and an address comparator 52. The address buffer 51 receives the upper 20 bits of the 24-bit address and always outputs the upper 20 bits of the immediately preceding address. The address comparator 52 compares an output of the address buffer 51 with the upper 20 bits of the current address.

If both are in agreement, the data are stored into the buffer 301 continuing since the address value specified by the external bus master 41 falls within the address limits of 16 bits. On the other hand, if both are in disagreement, the buffer 301 is controlled to transfer the stored data to the DRAM 27 through the bus ID <0:127>. At this time, the control block 303 gives the read/write signal R/$\overline{W}$ to the DRAM 27 so that the DRAM 27 may start a write operation.

FIGS. 13A to 13I are timing charts showing the above operation, where it is assumed that the addresses A1 to A4 have the same upper 20 bits and the address A5 has different upper 20 bits. The buffer 301 stores the data D1 to D4 corresponding to the addresses A1 to A4, but at the point of time when the address A5 is given (over the address limits), the data D1 to D4 are given to the bus ID <0:127> at a stroke. While the chip selection signal $\overline{CS}$ is asserted, the signals $\overline{HREQ}$ and $\overline{HACK}$ are asserted.

After that, with assertion of the access request to the DRAM 27, these data are written into the DRAM 27, and the data transfer completion signal $\overline{DC}$ which is given from the control block 303 to the external bus master 41 is negated (t4 to t5).

Then, the data D5 corresponding to the address A5 are stored into the buffer 301, and at the point of time when the access request issued by the external bus master 41 is terminated (the chip selection signal $\overline{CS}$ is negated), the data D5 are transferred to the DRAM 27 through the bus ID <0:127> (the data transfer completion signal $\overline{DC}$ is asserted, and then the access request to the DRAM 27 is negated: t5 to t6).

(2-g) Read of Data from DRAM 27 by External Bus Master 41 at Address beyond Address Limits FIGS. 14A to 14I are timing charts showing the operation for a read operation of data out from the DRAM 27 by the external bus master 41 in a case where the upper 20 bits of the address are changed (crossing over the address limits). The external bus master 41 issues a read request (the chip selection signal $\overline{CS}$ is asserted and the read/write signal R/$\overline{W}$ signifies read).

With assertion of the access request to the DRAM 27, the data D1, D2 and D3 corresponding to the 24-bit addresses A1, A2 and A3 which have the same upper 20 bits are given to the bus ID <0:127> (t0 to t1). The address A5, which has the different 20 bits, is not put on the bus ID <0:127> yet at the time t1. While the data transfer completion signal $\overline{DC}$ remains asserted, the data D1, D2 and D3 are transferred outside through the buffer 301. The request for access to the DRAM 27 is once negated (t1).

When the address A5, falling over the address limits, is transferred to the external bus master 41, the data transfer completion signal $\overline{DC}$ is once negated and the request for access to the DRAM 27 is asserted again (t2). The data D5 corresponding to the address A5 are given to the bus ID <0:127> from the DRAM 27 and stored into the buffer 301. On the other hand, when the data D5 are transferred outside, the access request is terminated (the chip selection signal $\overline{CS}$ is negated: t3).

In broad outline, data of 128 bits at the maximum are read out from the DRAM 27 and stored into the buffer 301 (e.g., the above data D1, D2 and D3). According to the address value specified by the external bus master 41, corresponding 16-bit data (which correspond to two addresses stored in one latch) are outputted. If the address specified by the external bus master 41 is located beyond the address limits, new data (e.g., the above data D5) are transferred from the DRAM 27 to the buffer 301 and outputted to the external bus master 41 by 16 bits.

Thus, in the microprocessor of the first preferred embodiment, the external bus master 41, as well as the integrated CPU 1, can make an access to the integrated DRAM 27, and the CPU 1 can make an access to the external memory 4. Moreover, the CPU 1 and the external bus master 41 use in common the read/write signal R/$\overline{W}$ and the byte control signal BC. That avoids an increase in the needed number of pins.

Even if the internal data bus ID <0:127> and the external data bus D <0:15> have different bit widths, data can be transferred inside by controlling the buffer 301.

Furthermore, even if the address is located beyond the predetermined address limits, it is possible to avoid a wrong data transfer.

The Second Preferred Embodiment

Figure 15:
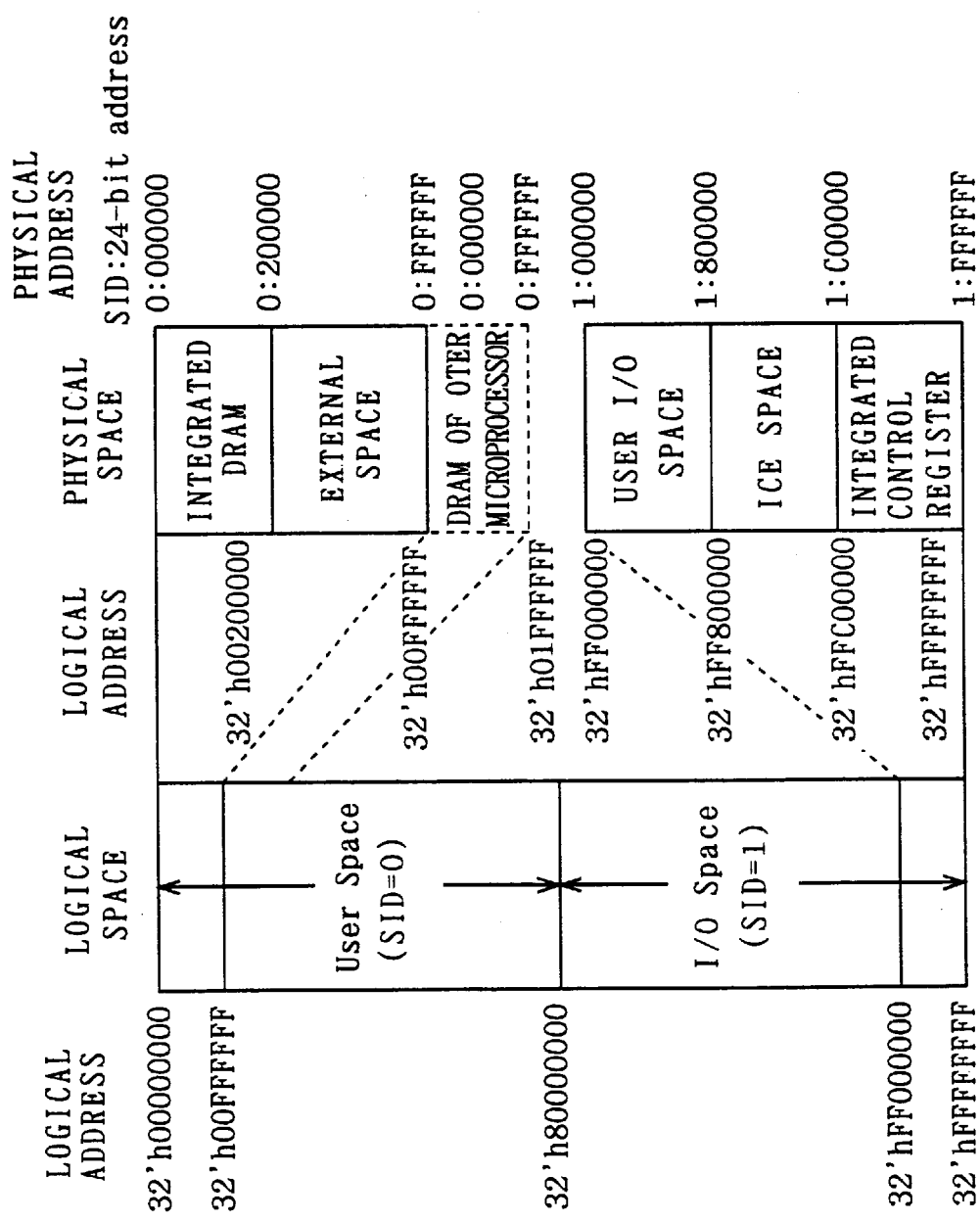
FIG. 15 is a schematic view showing an address space of a microprocessor 101.

Now, how to change cache mode will be discussed. FIG. 15 is a schematic view showing an address space of the microprocessor 101. The logical address is represented by 32-bit number in hexadecimal notation (32/log$_2$16=8 digits). Of logical space 00000000 to 80000000 (SID=0) used as user space, addresses 00000000 to 001FFFFF are allocated to physical space of the DRAM 27 integrated in the microprocessor 101. Further, addresses 00200000 to 00FFFFFF are allocated to space of the external memory 4. Thus, the address spaces of the two memories can be specified by the 24-bit addresses (the lower 6 digits of the logical address) as discussed in (2).

Furthermore, addresses FF000000 to FF7FFFFF are allocated to I/O space for user, addresses FF800000 to FFBFFFFF are allocated to space for ICE (In Circuit Emulator) and addresses FFC00000 to FFFFFFFF are allocated to physical space of the integrated control register. These allocations are made in the I/O space (SID=1).

Figures 16, 17, 18:
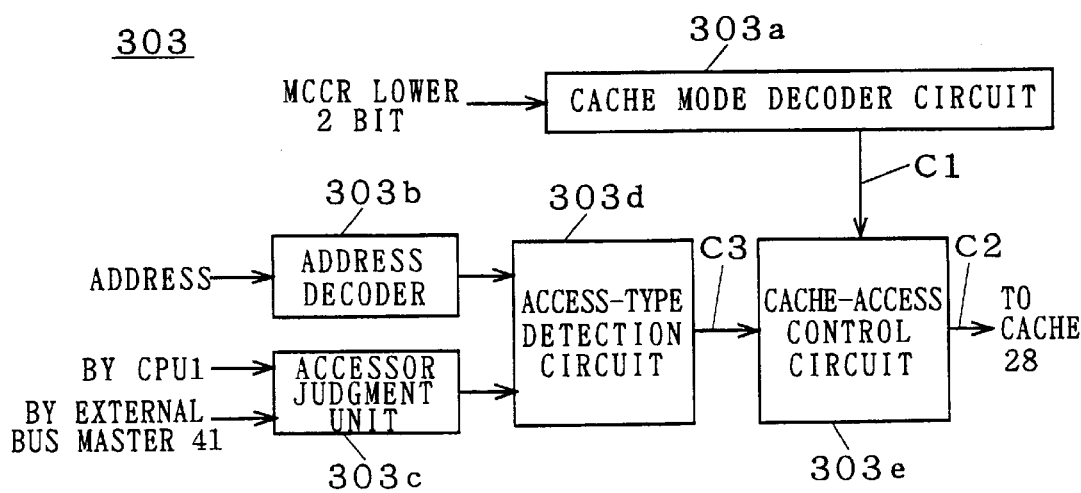
FIG. 16 is a schematic view showing part of address space of an integrated control register.
FIG. 17 is a schematic view showing detailed formats of data MSPR, MDPR and MCCR in detail.
FIG. 18 is a block diagram showing part of configuration of a control block 303.

FIG. 16 is a schematic view showing part of address space of the integrated control register. In FIG. 16, data MSPR for cache purge control, data MDRR for DRAM refresh control and data MCCR for memory control (each of 1 byte) are stored at addresses FFFFFFF4, FFFFFFF8 and FFFFFFFC, respectively.

FIG. 17 is a schematic view showing detailed formats of the data MSPR, MDRR and MCCR. At the seventh bit of the data MSPR, 1-bit data value is stored to indicate whether a purge control is made or not. At the seventh bit of the data MDRR, 1-bit data value is stored to indicate whether a refresh control is made or not. At the sixth and seventh bits of the data MCCR, 2-bit data value is stored to indicate the type of cache mode.

The controls based on the data MSPR, MDRR and MCCR will be discussed m below.

(3) Change of Cache Mode

With the control based on the data MCCR, the microprocessor 101 can switch the cache mode depending on the type of data to be cached. Possible cache modes are as follows:

(i) cache-off mode; not to cache any data, (ii) all-shared cache mode; to cache instructions/data stored in the external memory 4 or the DRAM 27 accessed by the CPU 1 and data read out from/written into the DRAM 27 by the external bus master 41, (iii) shared cache mode; to cache instructions/data stored in the external memory 4 or the DRAM 27, regardless of whichever, accessed by the CPU 1, (iv) instruction cache mode; to cache instructions stored in the external memory 4 or the DRAM 27, regardless of whichever, accessed by the CPU 1, (v) data cache mode; to cache data stored in the external memory 4 or the DRAM 27, regardless of whichever, accessed by the CPU 1, (vi) internally-shared cache mode; to cache instructions/data stored in the DRAM 27 accessed by the CPU 1, (vii) internal instruction cache mode; to cache instructions stored in the DRAM 27 accessed by the CPU 1, (viii) internal data cache mode; to cache data stored in the DRAM 27 accessed by the CPU 1, (ix) externally-shared cache mode; to cache instructions/data stored in the external memory 4 accessed by the CPU 1, (x) external instruction cache mode; to cache instructions stored in the external memory 4 accessed by the CPU 1, (xi) external data cache mode; to cache data stored in the external memory 4 accessed by the CPU 1, (xii) external memory cache mode; to cache instructions/data stored in the DRAM 27 accessed by the CPU 1 and data written into the DRAM 27 by the external bus master 41, (xiii) internal memory cache mode; to cache instructions/data stored in the DRAM 27 accessed by the CPU 1 and data read out from the DRAM 27 by the external bus master 41, and (xiv) external bus master cache mode; to cache data read out from/written into the DRAM 27 by the external bus master 41.

Of these cache modes, four cache modes, (i) cache-off mode, (vi) internally-shared cache mode, (x) external instruction cache mode and (iv) instruction cache mode can be selected by making reference to the 2-bit data value stored in the sixth and seventh bits of the data MCCR.

FIG. 18 is a block diagram showing part of configuration of the control block 303. As described with reference to FIG. 15, the address space of the DRAM 27 and that of the external memory 4 are separated, and an address decoder 303*b* judges which to be accessed. The judgment result is given to an access-type detection circuit 303*d*. An accessor judgment unit 303*c* judges which of the CPU 1 and the external bus master 41 makes an access, and gives the judgment result to the access-type detection circuit 303*d*.

The access-type detection circuit 303*d* provides a cache-access control circuit 303*e* with information C3 based on the judgment results of the address decoder 303*b* and the accessor judgment unit 303*c*, indicating whether the signal on the bus ID <0:127> is instruction or data, and by what the instruction is requested if the signal is instruction, and the like.

On the other hand, the cache mode decoder circuit 303*a* provides the cache-access control circuit 303*e* with information C1 based on the lower 2-bit value of the data MCCR, indicating which of the cache modes is requested. The cache-access control circuit 303*e* provides the cache 28 with a filling signal C2 based on the informations C1 and C3, for controlling whether caching of the data stored in the DRAM 27 should be made or not ((vi) internally-shared cache mode), whether caching of the instruction stored in the external memory 4 should be made or not ((×) external instruction cache mode), whether caching of the instruction stored in the external memory 4 or the DRAM 27, regardless of whichever, accessed by the CPU 1 should be made or not ((iv) instruction cache mode), or whether caching operation is made or not ((i) cache-off mode).

Figure 19:
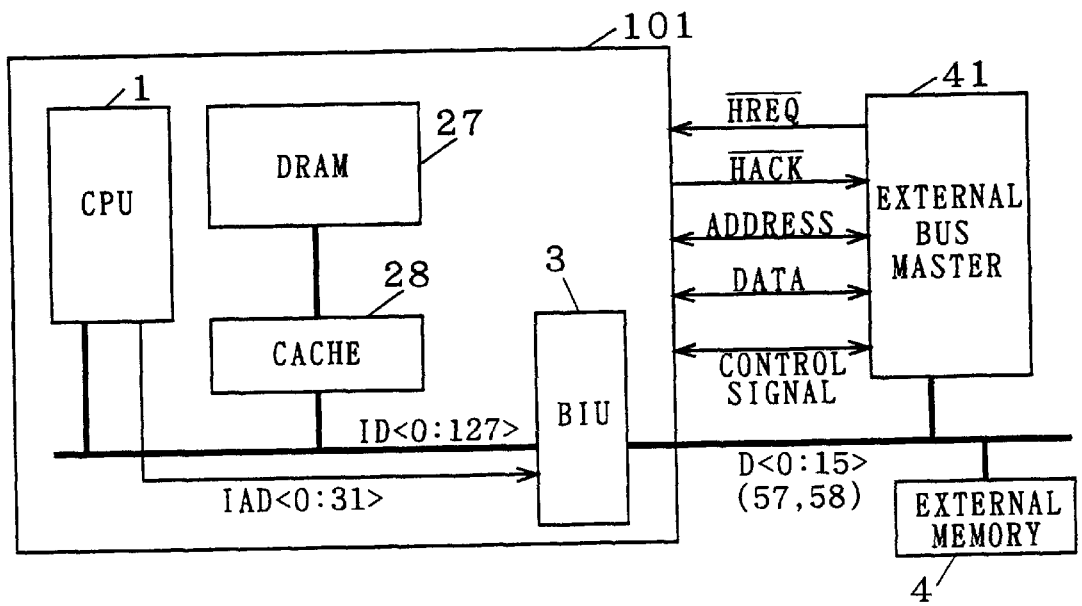
FIGS. 19 to 21 are block diagrams schematically showing a configuration of the microprocessor 101.
Figure 20:
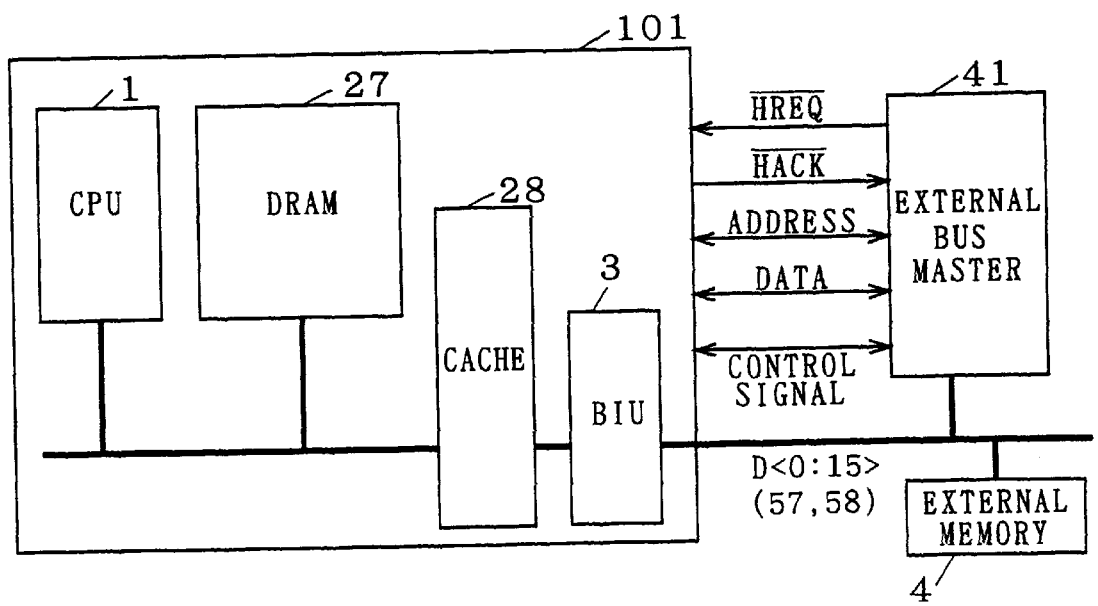
Figure 21:
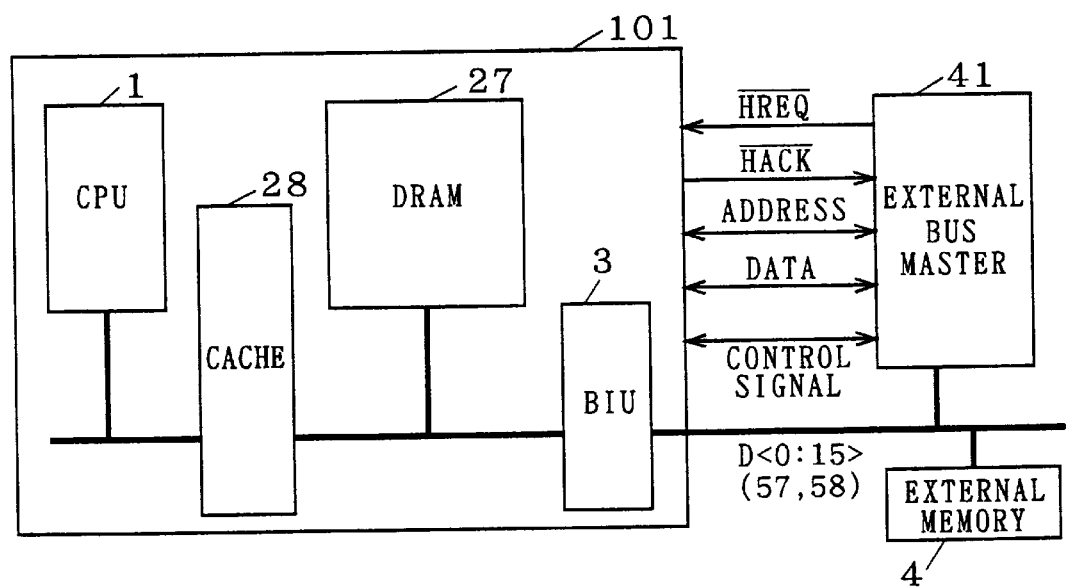

FIGS. 19 to 21 are block diagrams schematically showing a configuration of the microprocessor 101 in (vi) internally-shared cache mode, (x) external instruction cache mode, and (iv) instruction cache made, respectively. In FIG. 19, the cache 28 is interposed between the DRAM 27 and the bus ID <0:127>. In FIG. 20, the cache 28 is interposed between the BIU 3 and the bus ID <0:127>. In FIG. 21, the cache 28 is interposed between the CPU 1, the DRAM 27 and the BIU 3.

In these figures, the data bus D <0:15>, control bus 57, and the address bus 58 are represented by one line, and the signals $\overline{HREQ}$, $\overline{HACK}$, address, data (including instruction), and control signals BC, R/$\overline{W}$, CS and the like are transferred through these buses.

(3-a) (vi) Internally-Shared Cache Mode

This mode, in which the instructions/data stored in the DRAM 27 to be accessed by the CPU 1 are cached, is used when programs are stored in the DRAM 27 (see FIG. 19).

When the instruction stored in the DRAM 27 is fetched by the CPU1, whether a cache hit or miss is checked under the control by the BIU 3. If a hit, the instruction is outputted to the bus ID <0:127> from the cache 28 and transferred to the IQ 8 (included in the CPU 1 in FIG. 19).

If a miss, the instruction is transferred to the cache 28 and the CPU 1 from the DRAM 27. For example, the cache 28 has a capacity of 256 (=$2^8$) entries ×128 bits=4 KB. Of 24-bit address IAD <7:31>, 8-bit IAD <20:27> serves as entry address and 13-bit LAD <7:19> is registered as tag. The 128-bit data read out from the DRAM 27 are written into the cache 28. At this time, a valid bit for the entry specified by IAD <20:27> is set.

When the CPU 1 reads data stored in the DRAM 27, whether a cache hit or miss is checked like in the case of instruction fetch. If a hit, the data are read out from the cache 28, and if a miss, the data are read out from the DRAM 27.

When the CPU 1 writes data into the DRAM 27, whether a cache hit or miss is checked. If a hit, the write data are written into some of the corresponding 128-bit entry of the cache 28, and a dirty bit for this entry is set. The data in the entry with the dirty bit set are written back when the next cache data with a same entry address are entered (replace). If a miss, the write data are written into the DRAM 27.

Instead of replace, the data may be written back to the DRAM 27 by a purge operation specified by the seventh bit of the signal MSPR of FIG. 17.

(3-b) (x) External Instruction Cache Mode

This mode, in which an instruction stored in the external memory 4 is cached, is used, for example, when an instruction ROM is provided as the external memory 4 to store an instruction and the DRAM 27 stores data (see FIG. 20).

In order for the CPU 1 to fetch an instruction from the external memory 4, whether a cache hit or miss is checked. The instruction is fetched from the cache 28 if a hit and fetched from the external memory 4 if a miss. The instructions fetched from the external memory 4 are transferred in a burst transmission mode to the microprocessor 101 to fill the cache 28, and 128 bits of the instructions are stored in the BIU 3 and then transferred to the cache 28.

(3-c) (iv) Instruction Cache Mode

This mode, in which an instruction to be fetched by the CPU 1 is cached, is used when instructions are stored in the DRAM 27 and the external memory 4 (see FIG. 21). Whether the instruction to be fetched by the CPU 1 is hit or not in the cache is checked. The instruction is fetched from the cache 28 if a hit and fetched from the DRAM 27 or the external memory 4 if a miss. The fetch of instructions from the external memory 4 is performed like in (3-b). In the fetch of instructions from the DRAM 27, 128 bits of the instructions fill the cache 28 by one read operation.

In each of the cache modes, to avoid caching of a region in the DRAM 27 and the external memory 4 which should not be cached (in which such data as would be frequently written back even if cached, resulting in degradation in processing speed, are stored), a non-cacheable region may be specified using an address. It is natural that the caching of the non-cacheable region can be also avoided with assertion of non-cacheable pin which is usually provided in the microprocessor 101 in an access to this region.

Thus, in the microprocessor of the second preferred embodiment, the DRAM 27 and the cache 28 are integrated together and cache mode can be selected.

The Third Preferred Embodiment.

(4) Refresh

The microprocessor 101 may be additionally provided with a refresh timer 26 for refresh control. FIG. 22 is a block diagram showing a configuration of the control block 303 and the relation between the control block 303 and the refresh timer 26 which gives a refresh request to the control block 303. In FIG. 22, the control block 303 with the configuration of FIG. 18 further has a DRAM-access control circuit 303f and an external-access control circuit 303g. The refresh timer 26 directly gives the refresh request to the DRAM-access control circuit 303f.

Figure 24:
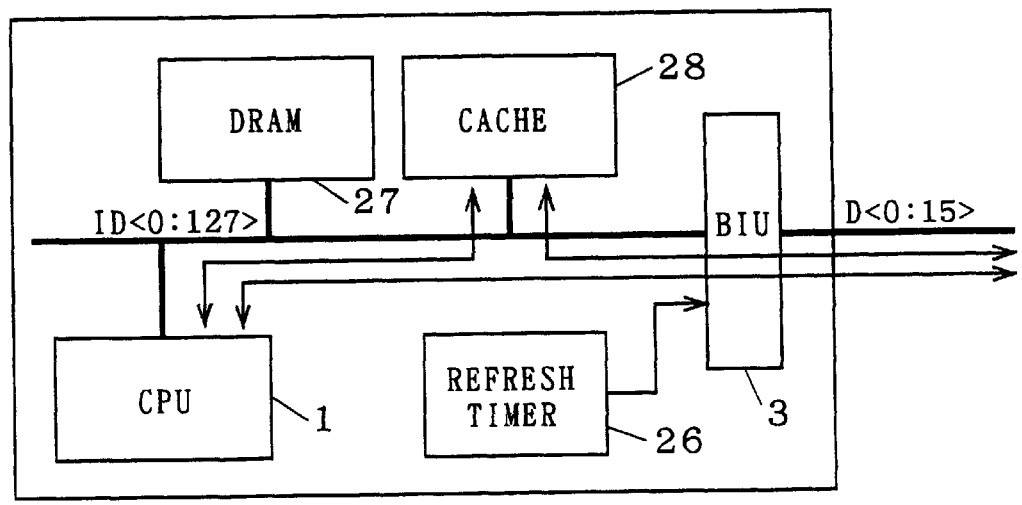
FIG. 24 is a block diagram showing a configuration of a microprocessor 102.

FIG. 24 is a block diagram showing a configuration of a microprocessor 102 which includes the BIU 3 having the refresh timer 26 and the control block 303. The refresh timer 26 gives the request to refresh the DRAM 27 at a predetermined time interval. The refresh timer 26 serves as a bus master for the DRAM 27 independently of the CPU 1 and the external bus master 41. In other words, the CPU 1 serves as the first internal bus master and the refresh timer 26 serves as the second internal bus master. The refresh request is issued on the basis of the value on the seventh bit of the data MDRR.

FIG. 24 shows an access to the DRAM 27 and the cache 28, with the DRAM 27 being refreshed. In other words, while the DRAM 27 is refreshed, the other bus masters, i.e., the CPU 1 and the external bus master 41 can not access the DRAM 27. However, the CPU 1 can access the cache 28 and the external memory 4 since the bus ID <0:127> is not occupied. Further, when the external bus master 41 accesses the DRAM 27 resulting in a cache hit, the following processing can be done.

Referring back to FIG. 22, the DRAM-access control circuit 303f gives a DRAM-access request on the basis of the information C3 if the refresh request given by the refresh timer 26 is negated. If the refresh request is asserted, the DRAM-access request is made invalid and a refresh signal to be given to the DRAM 27 is asserted to refresh the DRAM 27. Thus, while the DRAM 27 is refreshed, the access to the DRAM 27 by the other bus masters is disabled.

The cache-access control circuit 303e gives a cache filling signal to the cache 28, and the external-access control circuit 303g gives an external-access request to the external memory 4 and the external bus 41 on the basis of the information C3. When the refresh signal is asserted, these signals disable the caching to the cache 28 by the DRAM 27 and the access to the DRAM 27 by the external bus master 41. In other words, during the refresh operation, access requests not accompanied by the access to the DRAM 27 can be accepted.

Thus, in the microprocessor of the third preferred embodiment, its operation can be controlled even if a plurality of bus masters (e.g., the CPU 1 and the refresh timer 26) are provided inside.

(5) Purge

When the value on the seventh bit of the data MSPR indicates the purge control, if the cache is performed in the write back method, the data with dirty bit set stored in the cache are written back into the DRAM 27. Then, the valid bit is reset. At this time, since the data are transferred to the DRAM 27 from the cache 28 or transferred to the external memory 4 from the cache 28, the bus ID <0:127> is occupied and the access to the DRAM 27 and the external memory 4 by the bus master is disabled.

If the cache is performed in the write through method, the update data are written also into the DRAM 27 and the external memory 4, and the valid bit for the entry of the cache 28 is reset when the purge control is made.

Variations.

(6) Separate Cache

Figure 25:
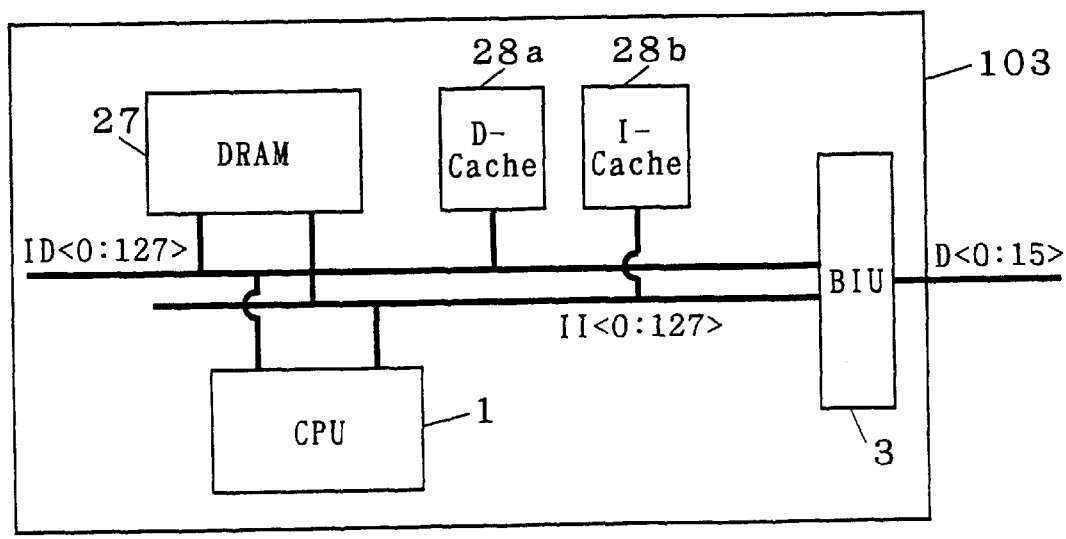
FIG. 25 is a block diagram illustrating a configuration of a microprocessor with Harvard architecture.

FIG. 25 is a block diagram illustrating a configuration of a microprocessor 103 with Harvard architecture. In the microprocessor 103, the cache memory consists of two separate caches, i.e., an instruction cache 28b of 2 KB and a data cache 28a of 2 KB. The instruction cache 28b and the data cache 28a are connected to the DRAM 27, the CPU 1 and the BIU 3 through the bus II <0:127> on which only instructions are propagated and through the data bus ID <0:127> on which only data other than instructions are propagated, respectively.

Using cache mode, which is cached by each of the caches 28a and 28b, the DRAM 27 or the external memory 41, is determined.

(7) Coexistence of More Than One Microprocessor

Figure 26:
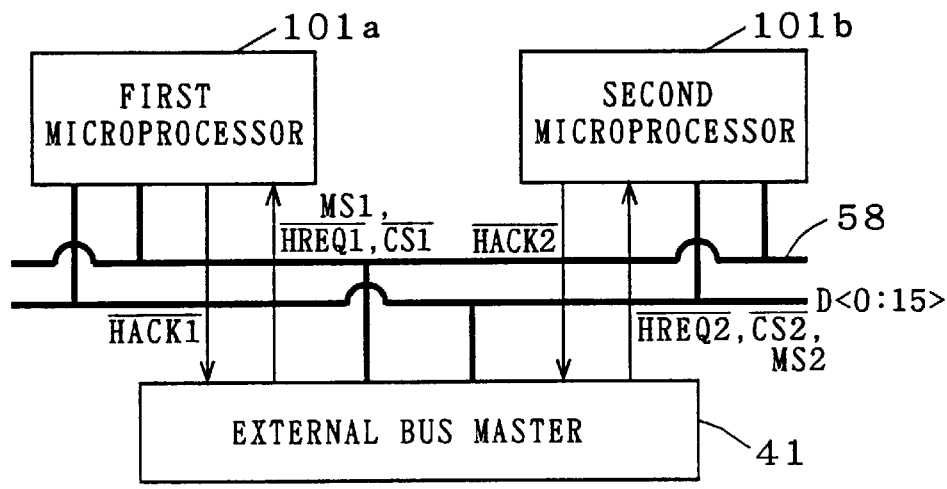
FIG. 26 is a block diagram showing two coexisting microprocessors.
Figure 27:
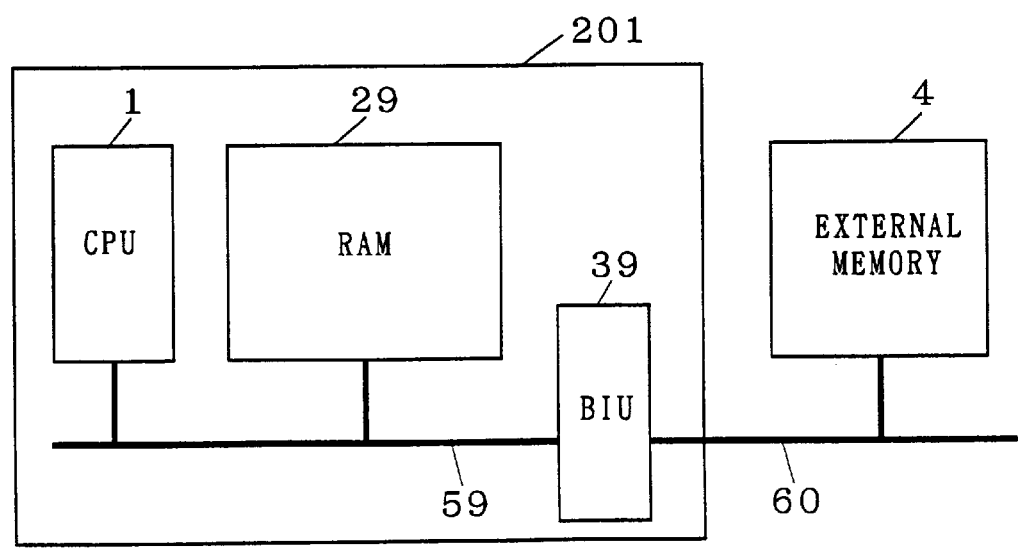
FIGS. 27 and 28 are block diagrams showing a background art.
Figure 28:
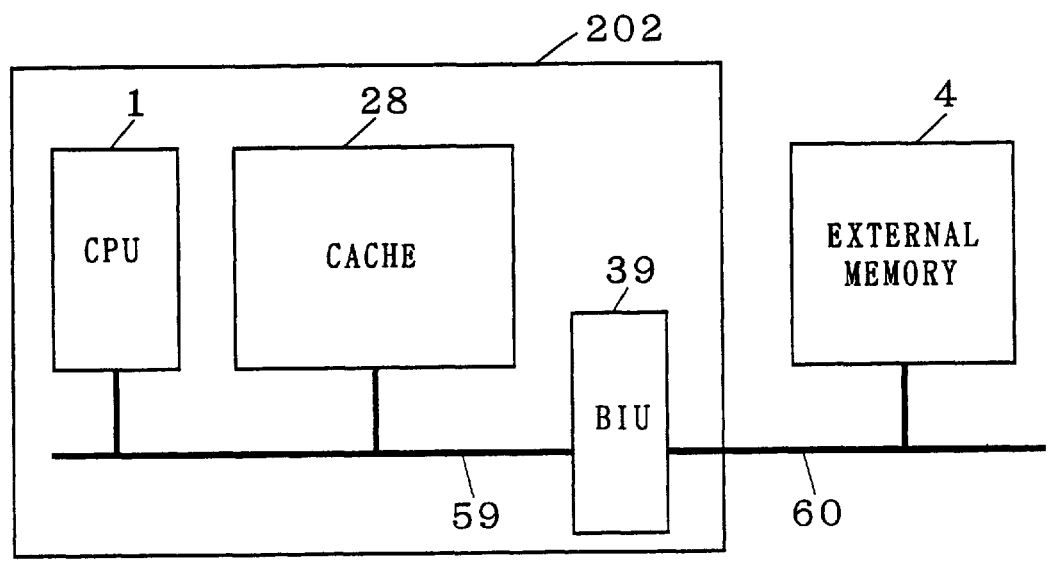

FIG. 26 is a block diagram showing two coexisting microprocessors 101a and 101b (both of which may have the same configuration as the microprocessor 101) which are connected to the same external bus master 41 and the external memory 4 through the address bus 58 and the data bus D <0:15>. The first microprocessor 101a and the second microprocessor 101b perform program processings using instructions/data stored in the respective DRAMs 27 integrated in the two microprocessors.

The external bus master 41 gives a halt request signal $\overline{HREQ1}$ and a chip selection signal $\overline{CS1}$ to the first microprocessor 101a. The first microprocessor 101a gives an $\overline{HREQ}$ acknowledge signal $\overline{HACK1}$ to the external bus master 41. With transmission of these signals, the external bus master 41 performs a read/write operation of data stored in the DRAM 27 of the first microprocessor 101a. Similarly, with transmission of a halt request signal $\overline{HREQ2}$, a chip selection signal $\overline{CS2}$ and an HREQ acknowledge signal $\overline{HACK2}$, the external bus master 41 performs a read/write operation of data stored in the DRAM 27 of the second microprocessor 101b.

Furthermore, it is also possible that the external memory 4 stores data which are commonly accessed by the first and second microprocessors 101a and 101b and the data are read out therefrom in response to access requests issued by the first and second microprocessors 101a and 101b. In this case, to avoid competition between the first and second microprocessors 101a and 101b, master/slave signals MS1 and MS2 are given to the first and second microprocessors 101a and 101b, respectively, and these signals are exclusively asserted to give a function of master to one of the two microprocessors and a function of slave to the other. The microprocessor serving as master can access the external memory 4 and that serving as slave can not.

As a matter of course, assertion/negation of the master/slave signals MS1 and MS2 may be switched to each other. Switching can be made only after the current bus operation is terminated.

The respective DRAMs 27 integrated in the microprocessors 101a and 101b may store different data. As has been discussed with reference to FIG. 14, in each address space of the microprocessors 101a and 101b, addresses 00000000 to 001FFFFF are allocated to the DRAM 27. However, the physical addresses of the respective DRAMs 27 in the microprocessors 101a and 101b must be separated.

For example, of 32-bit address space (having a capacity of 4 GB provided that 1-byte data can be stored at one address), addresses 00000000 to 001FFFFF may be allocated to the DRAM 27 integrated in the first microprocessor 101a and addresses 01000000 to 011FFFFF may be allocated to the DRAM 27 integrated in the second microprocessor 101b. Allocation of these addresses is made in the user space (SID=0) of the logical space. With this allocation of address space, the two microprocessors 101a and 101b can perform separate processings of instructions/data stored in the respective integrated DRAMs 27 using 24-bit address.

While the invention has been shown and described in detail, the foregoing description is in all aspects illustrative and not restrictive. It is therefore understood that numerous modifications and variations can be devised without departing from the scope of the invention.

We claim:

1. A microprocessor comprising;
   an integrated memory;
   an internal bus connected to said integrated memory;
   an internal bus master for accessing said integrated memory through said internal bus; and
   a bus interface for controlling an operation of said internal bus,
   wherein an external bus master and an external memory are externally connected to said microprocessor through an external bus,
   said microprocessor further comprising a cache memory to be filled with data stored in said integrated memory and said external memory,
   and wherein said bus interface
   (a) has a buffer having the same width as said internal bus,
   (b) arbitrates between a request for access to said integrated memory issued by said external bus master and that issued by said internal bus master, and
   (c) accepts a request for access to said integrated memory and said cache memory issued by said internal bus master while said buffer and said external bus master make accesses through said external bus.

2. The microprocessor of claim 1, wherein
said integrated memory is a DRAM.

3. The microprocessor of claim 1, wherein a protocol in a read operation of data stored in said integrated memory by said external bus master, includes steps sequentially conducted that
   ① said external bus master issues an access request to said integrated memory,
   ② said bus interface gives an access permit to said external bus master,
   ③ said external bus master makes a chip selection,
   ④ said external bus master asserts a read access signal to input an address.
   ⑤ read data corresponding to said address are read out from said integrated memory to said internal bus under a control of said bus interface,
   ⑥ said read data are transferred from said internal bus to said external bus master through said bus interface,
   ⑦ said access request and said chip selection by said external bus master are reset, and
   ⑧ said access permit by said bus interface is reset.

4. The microprocessor of claim 1, wherein a protocol in a write operation of data stored in said integrated memory by said external bus master, includes steps sequentially conducted that
   ① said external bus master issues an access request to said integrated memory,
   ② said bus interface gives an access permit to said external bus master,
   ③ said external bus master makes a chip selection,
   ④ said external bus master asserts a write access signal to input an address,
   ⑤ write data corresponding to said address are transferred to said internal bus from said external bus master through said bus interface,
   ⑥ said write data are written into said integrated memory from said internal bus under a control of said bus interface,
   ⑦ said access request and said chip selection by said external bus master are reset, and
   ⑧ said access permit by said bus interface is reset.

5. The microprocessor of claim 1, wherein
a control signal for controlling access is used commonly both in an access to said integrated memory by said external bus master and in an access to said external memory by said internal bus master.

6. The microprocessor of claim 5, wherein
said control signal includes a read/write signal serving both as a read access signal and as a write access signal and a byte control signal.

7. The microprocessor of claim 1, wherein
data stored in said buffer are once released when a plurality of addresses specified by said external bus master are located within and beyond predetermined address limits which are determined by a capacity of said buffer.

8. The microprocessor of claim 7, wherein
only starting instruction/data are transferred to said internal bus master and the remaining instruction/data are once stored into said buffer and then transferred to said integrated memory when said internal bus master reads instructions/data out from said external memory in a burst mode.

9. A microprocessor comprising;
an integrated memory;
an internal bus connected to said integrated memory;
first and second internal bus masters for accessing said integrated memory through said internal bus; and
a bus interface for controlling an operation of said internal bus,
wherein said bus interface has memory access control means for ignoring an access request to said integrated memory issued by said second internal bus master when an access request to said integrated memory issued by said first internal bus master is valid.

10. The microprocessor of claim 9, wherein said first internal bus master is a CPU and said second bus master is a refresh timer.

11. A microprocessor comprising;
an integrated memory;
an internal bus connected to said integrated memory;
an internal bus master for accessing said integrated memory through said internal bus; and
a bus interface for controlling an operation of said internal bus,
wherein an external bus master and an external memory are externally connected to said microprocessor through an external bus,
said microprocessor further comprising a cache memory connected to said internal bus, to be filled with data of said integrated memory and said external memory,
and wherein said bus interface generates an access request to said integrated memory issued by said internal bus master, an access request to said integrated memory issued by said external bus master and a filling signal for indicating a cache object of said cache memory on the basis of information specifying a cache mode.

12. The microprocessor of claim 11, wherein
said cache object includes an instruction fetched from said integrated memory by said internal bus master.

13. The microprocessor of claim 12, wherein
said cache object includes data read out from/written into said integrated memory.

* * * * *